(12) United States Patent
Chinnan

(10) Patent No.: US 11,500,082 B2
(45) Date of Patent: Nov. 15, 2022

(54) ITERATIVE LEARNING ADAPTIVE SONAR SYSTEM, APPARATUS, METHOD, AND COMPUTER PROGRAM PRODUCT

(71) Applicant: Lockheed Martin Corporation, Bethesda, MD (US)

(72) Inventor: Anil P. Chinnan, Roslyn Heights, NY (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 549 days.

(21) Appl. No.: 16/681,263

(22) Filed: Nov. 12, 2019

(65) Prior Publication Data

US 2020/0150253 A1 May 14, 2020

Related U.S. Application Data

(60) Provisional application No. 62/767,272, filed on Nov. 14, 2018.

(51) Int. Cl.
| | |
|---|---|
| *G01S 7/53* | (2006.01) |
| *G01S 15/58* | (2006.01) |
| *G06N 5/04* | (2006.01) |
| *G06N 7/00* | (2006.01) |
| *G06N 20/00* | (2019.01) |

(52) U.S. Cl.
CPC .............. *G01S 7/53* (2013.01); *G01S 15/582* (2013.01); *G06N 5/045* (2013.01); *G06N 7/005* (2013.01); *G06N 20/00* (2019.01)

(58) Field of Classification Search
CPC ........ G01S 7/53; G01S 15/582; G01S 15/588; G06N 5/045; G06N 7/005; G06N 20/00; G06N 3/0454; G06N 3/008; G06N 3/08
See application file for complete search history.

(56) References Cited

U.S. PATENT DOCUMENTS

| | | | |
|---|---|---|---|
| 4,244,026 A | 1/1981 | Dickey, Jr. | |
| 5,235,656 A | 8/1993 | Hilgeman | |
| 10,026,182 B1* | 7/2018 | Chinnan | G06T 7/50 |
| 2020/0150253 A1* | 5/2020 | Chinnan | G06N 3/0454 |
| 2021/0027186 A1* | 1/2021 | Sanchirico | H04W 12/009 |

OTHER PUBLICATIONS

Anil Philip Chinnan, "Simultaneous Iterative Learning and Feedback Control Design", Columbia University, 2015, 201 pages.

* cited by examiner

*Primary Examiner* — Daniel Pihulic
(74) *Attorney, Agent, or Firm* — Foley & Lardner LLP

(57) ABSTRACT

A learning SONAR system and method including receiving, at an input, mission parameters including one or more of mission accuracy, mission covertness, learning rate, and training matrix dependency; transmitting pulsed signals; receiving return pulsed signals, for instance, using a tunable acoustic receiver having controllable receiver elements; and determining a number of the controllable receiver elements to generate estimates of altitude and 3D velocity based on a combination of transmit power, signal-to-noise ratio, and altitude range using an adaptive spatial sampler of a learning controller.

20 Claims, 24 Drawing Sheets

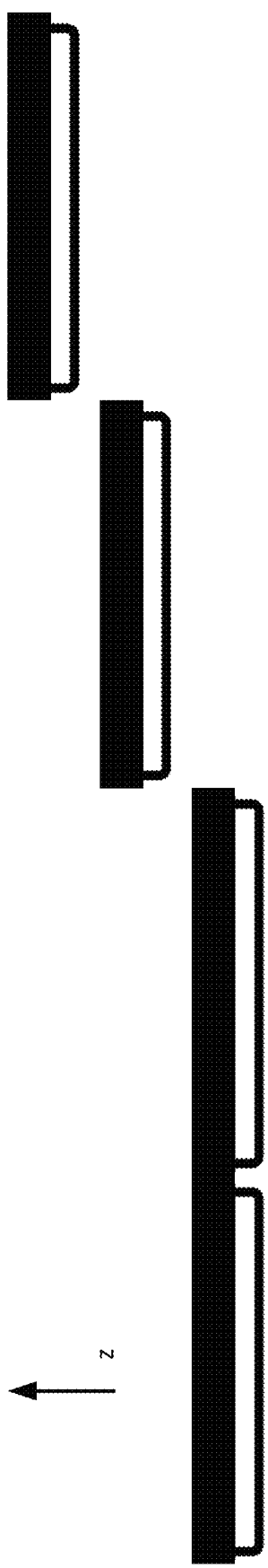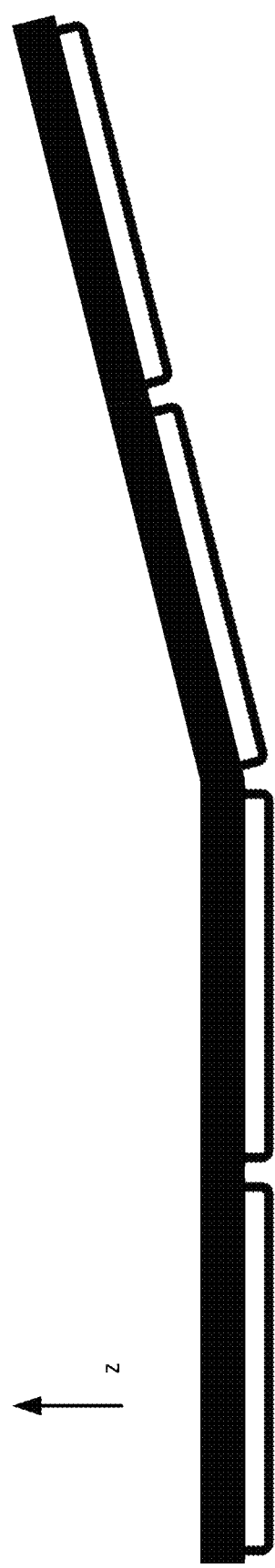

FIG. 13

ITERATIVE LEARNING ADAPTIVE SONAR SYSTEM, APPARATUS, METHOD, AND COMPUTER PROGRAM PRODUCT

CROSS-REFERENCE TO RELATED APPLICATIONS

This application claims the benefit of priority to Provisional Patent Application No. 62/767,272 filed Nov. 14, 2018, the entire contents of which are incorporated herein by reference.

FIELD

The present disclosure relates generally to using an acoustic signal to determine altitude and velocity reference of a vessel in accordance with target scaling values for a mission including mission accuracy, mission covertness, learning rate, and/or training matrix, and particularly to utilizing adaptive spatial resolution to perform reference estimation at targeted scaling values based on iterative learning processing.

BACKGROUND

There are a number of activities that may not have access to the Global Positioning System (GPS) for determining location. Unmanned Underwater Vehicles (UUV) and manned Underwater Vehicles (UV) are increasingly being used for deep-water offshore oil and gas exploration and require an ability to operate in environments that are without GPS. UUVs and UVs are also being used for ocean survey work and ocean bottom research. Military underwater vehicles and surface ships may need to counter maritime security threats and perform military operations in GPS-denied environments. There also may be activities in which access to GPS may become unavailable, such as situations in which GPS signals are not being reliably received by an aircraft or a vehicle or the aircraft or vehicle has selected not to use GPS for covert navigation.

Sonar systems can acquire velocity for marine vehicles. U.S. Pat. No. 4,244,026 ("the '026 patent"), incorporated herein by reference in its entirety, describes a velocity measuring correlation sonar that uses a planar array of receiving transducers spaced in a direction along which velocity components parallel to the plane of the array are to be measured. An implementation of the sonar system of the '026 patent includes two transmitting transducers and sixteen receiving transducers mounted in a fixed square array configuration, with an 11.2 inch spacing between receivers.

There is a need for a sonar system that can acquire a robust and precise altitude or distance and three-dimensional (3D) velocity reference on a marine vessel, can provide flexible accuracy and power requirements, and can be adjusted in an optimal fashion as desired by an application or user. There is a need for a sonar system that can acquire accurate altitude or distance and 3D velocity reference while meeting a low power requirement with acoustic returns that are at the same level as ambient noise in a marine environment. For example, Unmanned Underwater Vehicles (UUVs) and small Underwater Vehicles must operate using the lowest power possible in order to enable longest possible missions. Commercial and research ocean survey and other ocean research efforts may require sonar systems that are safe for marine wildlife but may require high accuracy. Military operations in marine environments are subject to constraints such as covertness during operation in specific areas. In a similar manner, aircraft and autonomous vehicles may require a sonar system to acquire three-dimensional velocity for navigation without a GPS.

Iterative Learning Controllers (ILC) are controllers that can produce high precision tracking in operations where the same tracking maneuver is repeated over and over again. ILC is based on a state space model, which may be expressed as $$x(k+1)=Ax(k)+Bu(k)+w(k) \quad \text{Equation (1)}$$

$$y(k)=Cx(k)+Du(k)+m(k) \quad \text{Equation (2)}$$

where A, B, C, and D are matrices describing a physical system. A is a matrix describing system dynamics, B relates to system inputs, w relates to process noise, C is an output matrix, D indicates a direct transmission of output, and m is a measurement noise. The matrix D is typically zero because the input typically does not influence the output instantly when applied in real systems. The index k denotes the time $t=kT$, where T is the reciprocal of the sampling frequency $f_s$, and is often referred to as the time step. The vectors $x(k)$, $u(k)$, and $y(k)$ denote the system state, input, and output, respectively.

While the representation given by Equations (1) and (2) are good for time-domain consideration, the general learning control problem formulation also facilitates repetition-domain analysis and design. In ILC there are two types of transient effects which persist in the output. One is the well-known time-domain transient or natural response commonly seen in all applications when a system is forced from equilibrium. The other is unique to the repetition-domain.

In the repetition-domain, a general disturbance vector $\underline{\Delta}j$ may be thought of as being influenced by two different elements, a repeating disturbance $\underline{d}$ and a stochastic disturbance $d_j$ which changes with each repetition, which may be expressed as $$\underline{\Delta}_j = \underline{d} + d_j \quad \text{Equation (3)}$$

The vector $\underline{d}$ represents the total effects of the initial conditions and repeating portions of both the process disturbance w(k) and measurement disturbance m(k). The vector $\underline{d}_j$ represents the total effects of the random portions of both w(k) and m(k).

The repeating disturbance portion of $\underline{\Delta}j$ can be eliminated from the formulation by introducing a backwards difference operator $\delta j$, as follows:

$$\delta_j \underline{y} = O \delta_j \underline{u} + \delta_j \underline{d} \quad \text{Equation (4)}$$

With the tracking error vector defined as $e_j = \underline{y}^* - \underline{y}_j$, where $y^*$ is the desired output or reference trajectory, the error relationship is $$\delta_j \underline{e} = -\delta_j \underline{y} \quad \text{Equation (5)}$$

While an iterative learning controller can compensate for unknown repeating errors and disturbances, it is not suited to handle non-repeating, stochastic errors and disturbances. Disturbances should be expected during each repetition, in most or all applications, from natural imbalances and imperfections that commonly persist in all types of system hardware. The limitations on performance in learning control applications, however, are set by both the static plant model and the overall randomness from repetition to repetition of the observed stochastic disturbances. If the plant model is full rank and square and there are no stochastic disturbances present, then zero tracking error is theoretically possible in learning control applications. On the other hand, the condition number of the plant model sets limitations on performance, since ill-conditioned plants are generally known to be difficult to control and zero tracking error may not be achievable. In implementations where the plant model is not full rank, error free control is not possible even if there are no disturbances present or if only repeating disturbances persist. Similarly, in the presence of stochastic disturbances, the performance will be limited by the magnitude of the randomness from iteration to iteration, even if the plant model is full rank and square. In such a situation, particularly when the stochastic disturbances vary in repetition to the extent that learning from previous cycles is difficult or practically impossible, substantial improvement can be achieved through the incorporation of feedback control (FBC).

Use of FBC, or current cycle feedback, can be specifically considered for handling non-repeating disturbances and becomes necessary when real-time error corrections are desired. FBC can be designed, with increased complexity, to handle both repeating and non-repeating stochastic disturbances in time. However, FBC lacks the ability to learn and improve performance through previous interactions with its operating environment and must be strictly causal. Therefore, FBC alone is typically not considered to have the potential to approach system hardware repeatability limits.

While ILC can compensate for repeating disturbances, FBC is necessary to address stochastic or non-repeating disturbances. Conventional feedback controllers, such as proportional, proportional-integral, proportional-derivative, and proportional-integral-derivative, are commonly designed using frequency response based techniques. However, since practical ILC applications are finite-time by their very nature, such steady state frequency response based design approaches are not best suited for designing the feedback controller. While strict causality must be followed for FBC, learning control can be non-causal since ILC is driven by previous cycle feedback.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

According to one or more embodiments of the disclosed subject matter, a learning SONAR system can be provided. The learning SONAR system can include: an input receiving mission parameters including one or more of mission accuracy, mission covertness, learning rate, and training matrix dependency; a transmitter transmitting pulsed signals; a tunable acoustic receiver having individually controllable receiver elements that receive return pulsed signals; and a learning controller including an adaptive spatial sampler, a combined iterative learning and feedback controller. The adaptive spatial sampler can determine a number of the controllable receiver elements to generate estimates of altitude and 3D velocity based on a combination of transmit power, signal-to-noise ratio, and altitude range.

One or more embodiments of the disclosed subject matter can also involve a learning SONAR method. The method can include receiving mission parameters including one or more of mission accuracy, mission covertness, learning rate, and training matrix dependency; transmitting pulsed signals; receiving return pulsed signals using a tunable acoustic receiver having individually controllable receiver elements; and determining a number of the controllable receiver elements to generate estimates of altitude and 3D velocity based on a combination of transmit power, signal-to-noise ratio, and altitude range using an adaptive spatial sampler of a learning controller.

The forgoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 12A, 12B illustrate arrangements of TAM receivers in the z direction;

FIG. 13 illustrates identification of the correlation peak;

DETAILED DESCRIPTION OF THE PREFERRED EMBODIMENTS

Figure 1:
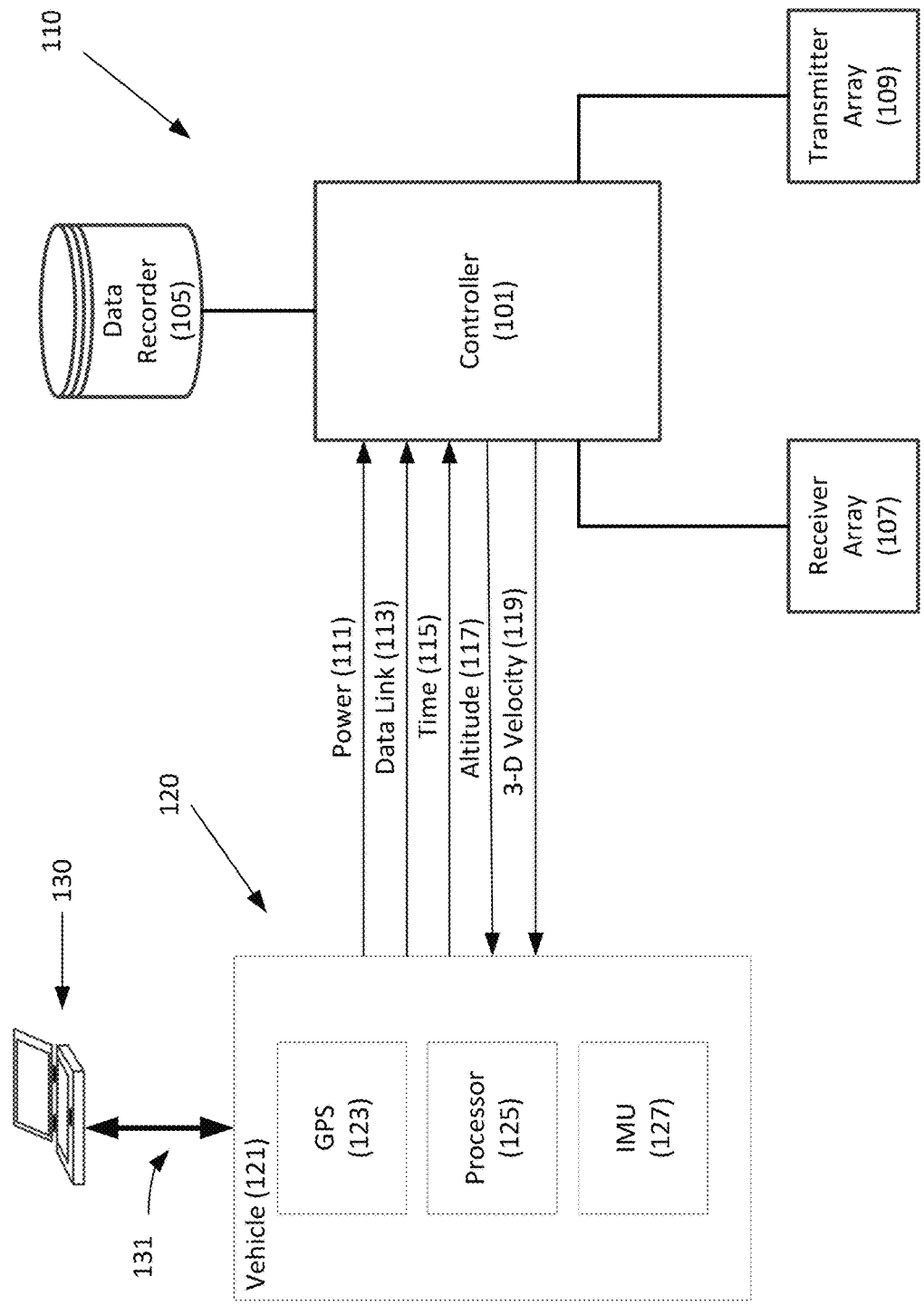
FIG. 1 is a block diagram of a high-level system in accordance with an exemplary aspect of the disclosure.

Referring now to the drawings, wherein like reference numerals designate identical or corresponding parts throughout the several views.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "proximate," "minor," and similar terms generally refer to ranges that include the identified value within a margin of 20%, 10% or preferably 5% in certain embodiments, and any values therebetween.

In disclosed embodiments, an approach that enables the design of a finite-time feedback and learning combination controller that can be tuned for a desired optimal behavior is presented. The approach can be cost function-based and can provide the designer full freedom to determine how the control burden is shared between feedback control (FBC) and iterative learning control (ILC). Benefits of complementing ILC with FBC include additional tracking and disturbance rejection capabilities that ILC may lack.

FIG. 1 is a block diagram of a non-limiting high-level system in accordance with an exemplary aspect of the disclosure. While the system in FIG. 1 generally relates to autonomous underwater platforms, it has applicability as an intelligent sensor across various platforms operated in various environments. Operation of the system may begin with initialization based on mission requirements as input by a user into a terminal 130. Mission requirements may be entered via user interface as inputs of scalar weights for a cost function, which are then used to optimally control an Iterative Learning Adaptive SONAR System 110 (i-LASS, referred to hereinafter as Learning SONAR System) to meet the mission requirements. The scalar weights will be passed from the user interface of the terminal 130 through a host platform 120 to the Learning SONAR System using appropriate datalinks 131. The host platform 120 may be an autonomous underwater vehicle 121, having a computer system 125, and optionally having a GPS 123 and an Inertial Measurement Unit (IMU) 127. Links 111, 113, 115 enable input-output communication for the Learning SONAR System 110 with the host platform 120, and data links 131 enable exporting of data from Learning SONAR System 110 back to the user terminal 130. Once initialized, Learning SONAR System 110 uses downward facing transmitters 109 and receivers 107, either from the host platform 120 or part of the Learning SONAR System 110 configuration, to generate precision 3D velocity 119 and altitude or distance 117 references.

Figure 2:
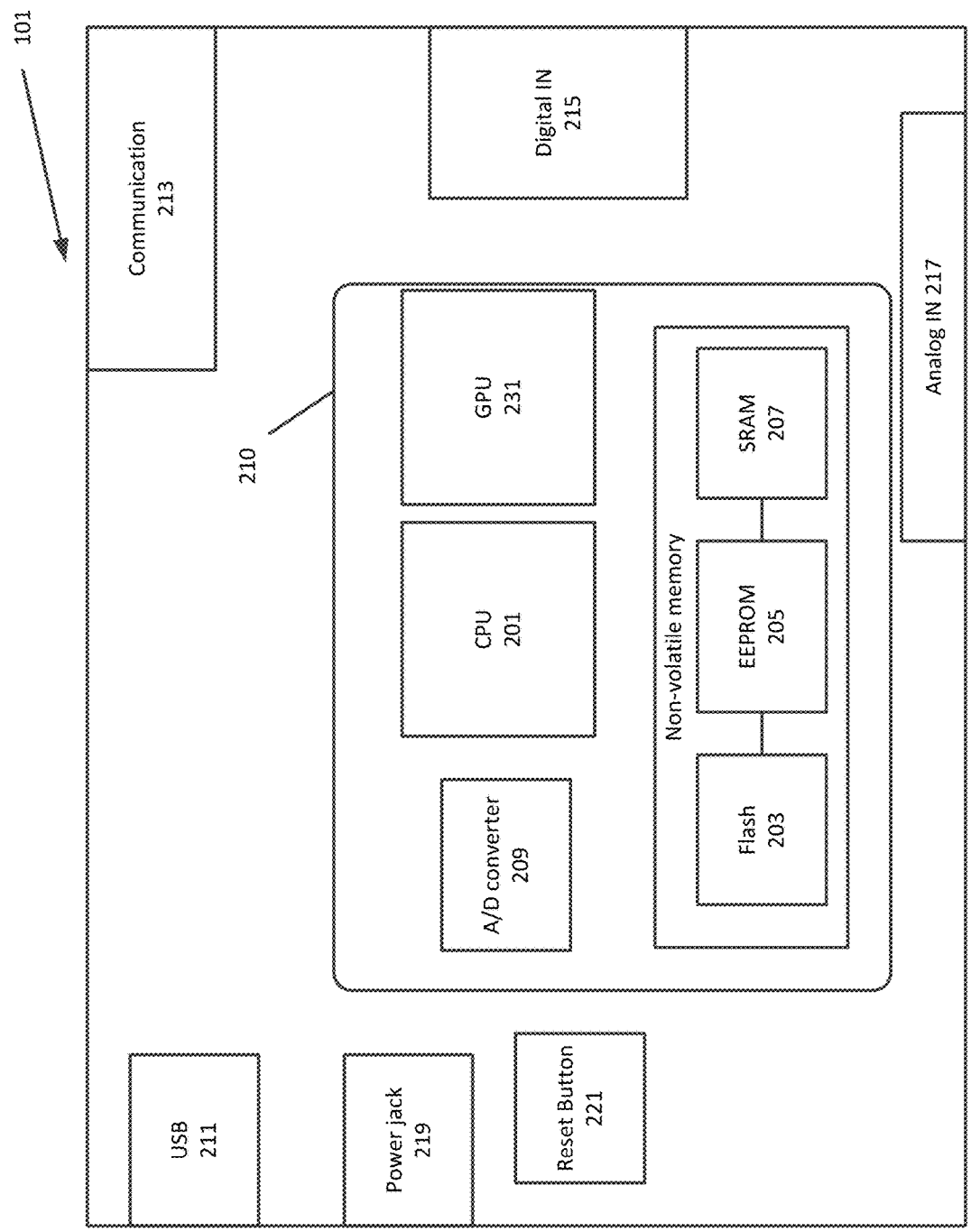
FIG. 2 is a block diagram of a controller in accordance with an exemplary aspect of the disclosure.

The computer-based control system 101 may be a microcontroller-based controller. FIG. 2 is a block diagram for a controller in accordance with an exemplary aspect of the disclosure. Although the description is of a microcontroller-based controller, it should be understood that other control circuitry may be used. Control circuitry may vary based on the type of processor, number of processing cores, inclusion of and size of non-volatile memory, the size of volatile memory, as well as whether or not it includes an A/D converter and/or D/A converter. In a non-limiting example, a microcontroller may contain one or more processor cores (CPUs) along with memory (volatile and optionally non-volatile) and programmable input/output peripherals. The one or more processing cores are processing circuits. A processing circuit includes circuitry. A processing circuit may also include devices such as an application specific integrated circuit (ASIC) and conventional circuit components arranged to perform program instructions. Program memory in the form of flash, ROM, EPROM, or EEPROM is often included on chip, as well as a secondary RAM for data storage. In one embodiment, the computer-based system 101 is an integrated circuit board with a microcontroller 210. The board includes digital I/O pins 215, analog inputs 217, hardware serial ports 213, a USB connection 211, a power jack 219, and a reset button 221. The integrated circuit board may optionally include a Graphics Processing Unit (GPU) 231, or a GPU may be provided in an external configuration. It should be understood that other microcontroller configurations are possible. Variations can include the number of pins, whether or not the board includes communication ports or a reset button, and whether or not a GPU is included.

In some embodiments, a microcontroller may be an a 8-bit, 16-bit, 32-bit, or 64-bit microcontroller having flash memory 203, SRAM 207, EEPROM 205, general purpose I/O lines, general purpose registers, a real time counter, flexible timer/counters, an A/D converter 209, and a JTAG interface for on-chip debugging. The microcontroller may be a single SOC.

In order to accurately determine altitude and 3D velocity of a vessel, it is necessary to perform correlation and other data processing on the return signal. Depending on the actual platform or the ocean floor, return signals may not be ideal. For example, it may be difficult to determine the actual leading edge of a pulse that helps mark the start point from which a correlation will be performed.

Figure 3:
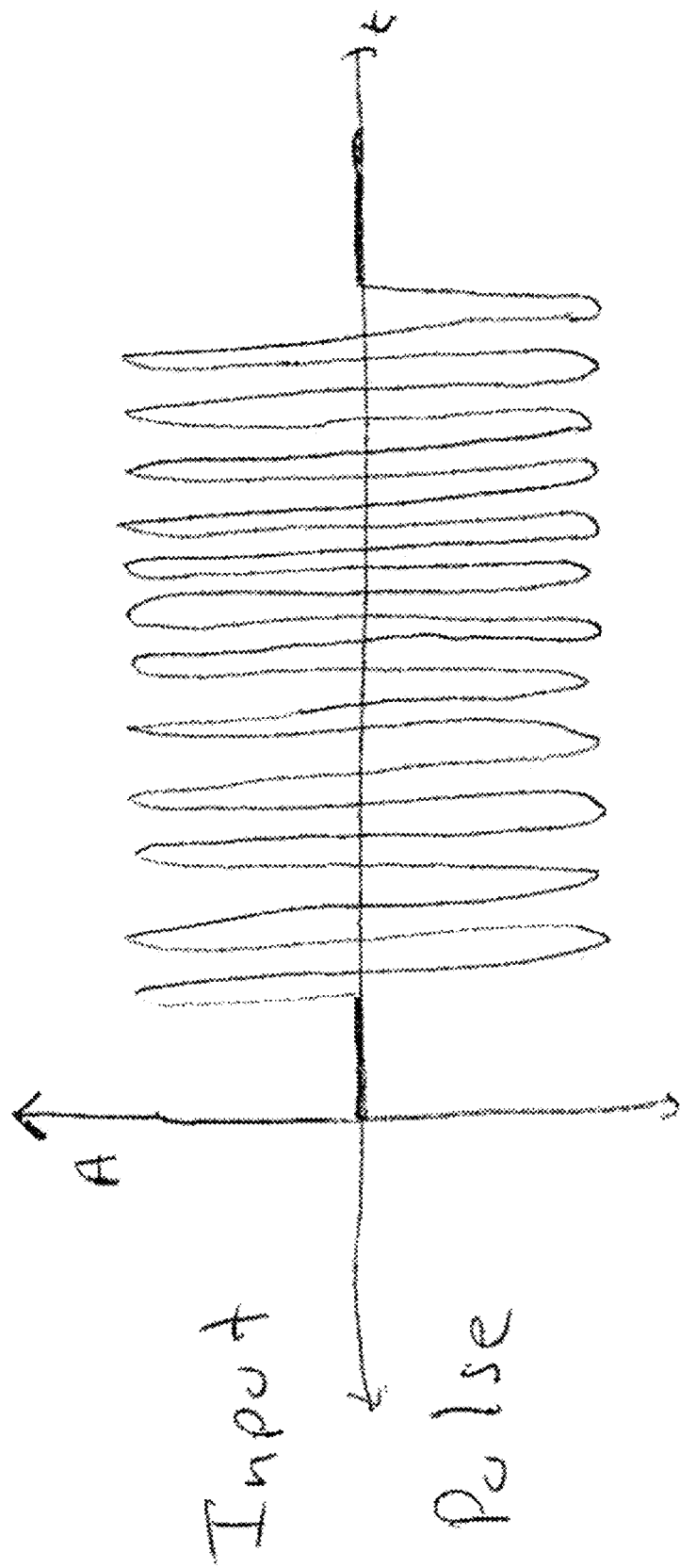
FIG. 3 is an exemplary transmit signal.
Figure 4:
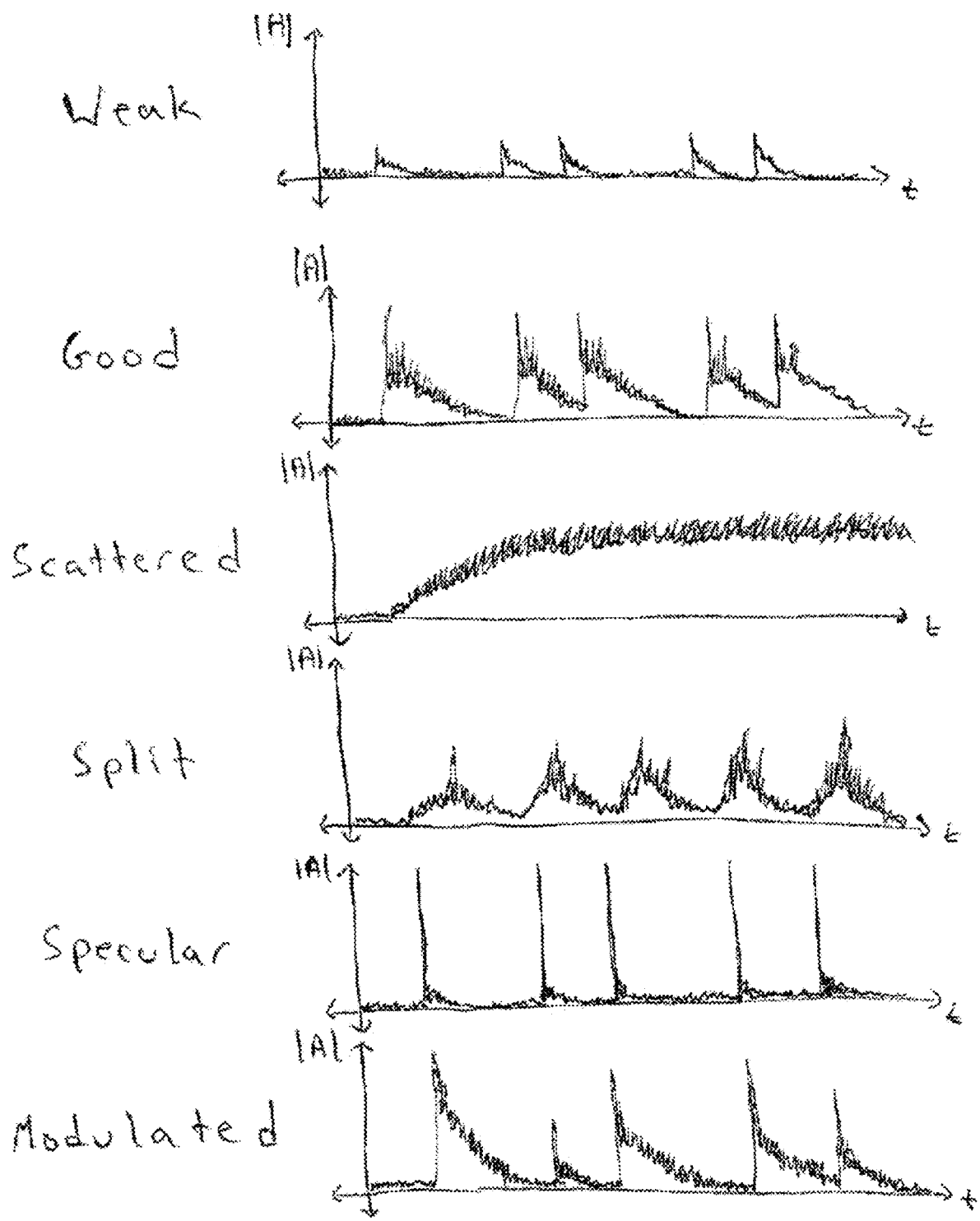
FIG. 4 shows exemplary types of echo return signals resulting from the transmit signal.

FIG. 3 illustrates an example transmit signal. FIG. 4 illustrates example possible return signals resulting from the transmit signal. In some cases, with a very reflective bottom, there may be return signals having a strong initial component, i.e., specular return signal.

In the case of bottom topography and composition that disperses the transmit signal in an incoherent way, the return signal may arrive as apparent elevated noise. In such a case, the return signal may be scattered resulting in true return pulses that are indistinguishable and difficult or impossible to process (scattered return signal). In some cases, the return signal may include components that vary with signal strength, i.e., a modulated return signal. In some cases, the return signal may just be a weak return signal. In some cases, the return signal may be split and arrive as a split signal. In each case, it may be difficult to correlate pulse pairs to generate a good correlation surface, or even clearly distinguish the leading edge of each pulse, for estimation. Adjustments to scaling and/or spectral values used in generating transmit signals can be helpful in these cases in order to obtain desirable return signals.

The Learning SONAR System implementation will be described for purposes of understanding in terms of an ocean environment. As mentioned above, the Learning SONAR System may be used for other environments. Knowing a category of return signal (Weak, Scattered, Split, Specular, Modulated, or Good) can aid in determining the particular adjustments to make to the transmit signal to improve the overall estimation process.

One approach to adjusting the transmit signal is to develop an ocean environment model. An ocean environment model may be used to determine the transmit signal that should be used based on the type of ocean environment. For example, in the case of a weak return signal, an ocean model may be configured to instruct the system to increase the transmit signal amplitude. In another example, in the case of a specular return, the ocean model may instruct the system to tone down amplitude and increase transmit frequency.

In some embodiments, an ocean environment model O may be represented by a function that takes an input and produces an output in the time domain. This ocean environment model O may be of the form of a machine learning system which can be trained using labeled datasets and efficiently implemented on a GPU. In one embodiment, the ocean environment model may be a machine learning system that is continuously trained. An initial model may be provided as a generic model of the ocean environment. The ocean environment model may be a model of the entire propagation path of a SONAR signal that takes into account water properties such as salinity, temperature, altitude, and type of ocean bottom. An initial model may begin with default values for salinity, temperature, and altitude of a generic ocean environment. The input may be a pulsed sinusoidal signal, and the output may be a received/return pulsed signal.

In some embodiments, an ocean environment model may be in the form of a supervised learning machine learning model, such as a support vector machine, deep neural network, or other supervised learning type of machine learning algorithm. In some embodiments, the ocean environment model may be continuously trained using reinforcement learning. Preferably, the ocean environment model uses a machine learning algorithm that can learn temporal patterns, such as convolution neural networks (CNN).

The Learning SONAR System implementation may be configured to handle stochastic or non-repeating disturbances. Provided an ocean environment model O, a control output $y_i$ may generally be defined as:

$$y_i = Ou_i + d_i \qquad \text{Equation (6)}$$

where $u_i$ is a control input and $d_i$ is a disturbance.

As will be discussed in more detail below, a spatial sample of return signals $y_i^{ss}$ may be defined in terms of a synthetic receive array (SRA) map P, defined as follows:

$$y_i^{ss} = PY_i \qquad \text{Equation (7)}$$

Matrix P may vary based on the number of receivers. If receivers are defective or behaving erratically, they will be removed or conditioned. The SRA map P provides the Learning SONAR System the ability to create synthetic receive apertures rapidly on the fly. An SRA can be described as the partitioning of a single tunable acoustic module (TAM) or collection on TAMs, as available on the host platform, into sections and/or subsections for the purpose of employing variable spatial sampling when receiving the echo returns. When generating P, the Learning SONAR System implementation will consider the health of all individual receivers, or smallest sensing elements, of every TAM. Then the Learning SONAR System will make intelligent decisions to eliminate unhealthy individual receivers or condition them, through the use of amplification parameters for example. This is done by defining P using numerical values ranging from 0 to those values that are necessary to make the unhealthy receiver output consistent with that of a healthy receiver in the current operating ocean environment.

Figure 5:
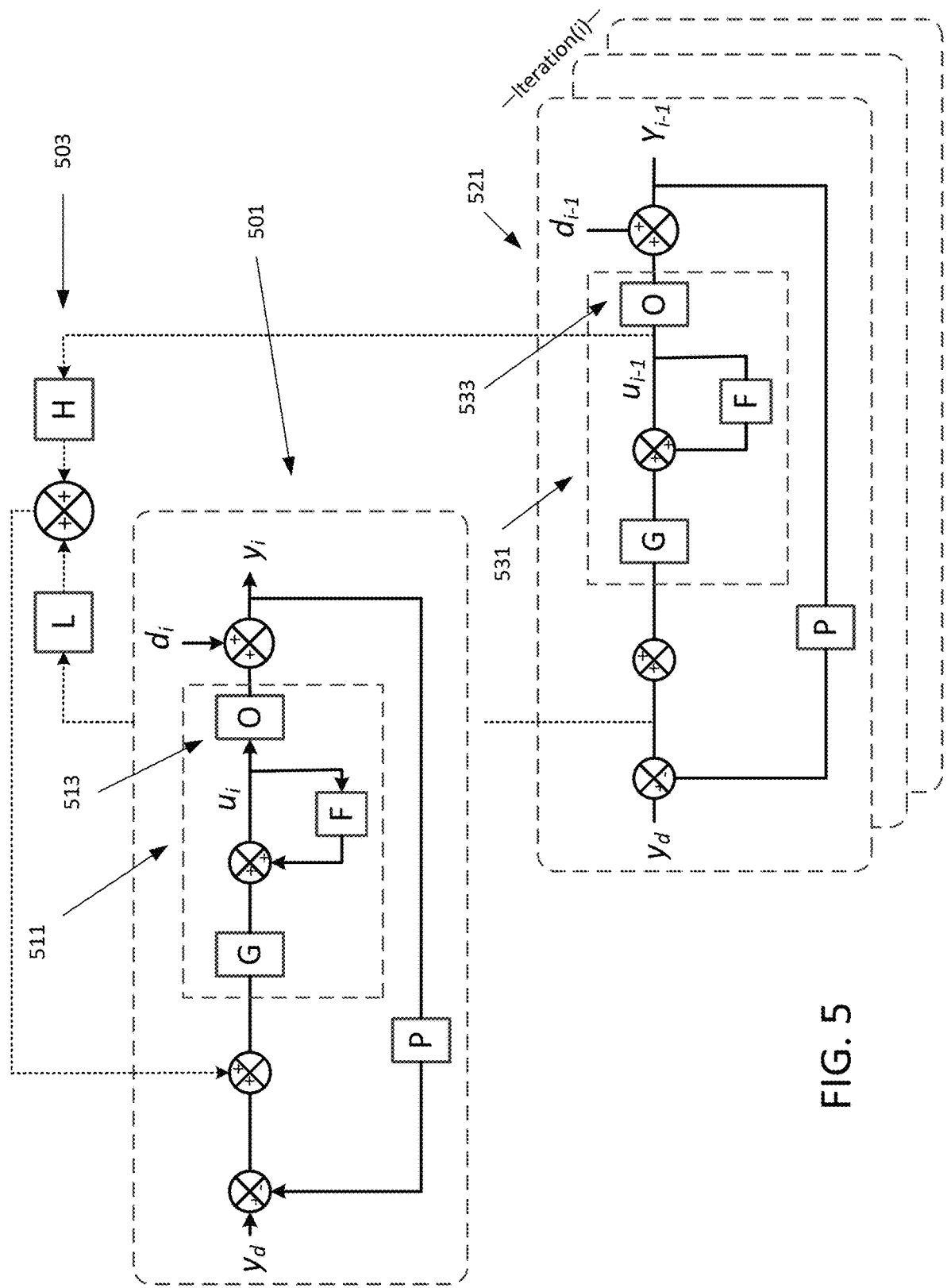
FIG. 5 is a schematic diagram of a combined feed forward and feedback controller in accordance with an exemplary aspect of the disclosure.

FIG. 5 is a schematic diagram of a combined feed forward and feedback controller in accordance with an exemplary aspect of the disclosure. It has been determined that a combined feed forward and feedback controller can be optimized by using a cost function to compute a change of control action at each iteration. By allowing a choice of parameter values for a cost function, the control burden between the feedback controller, which corrects for non-repeating disturbances, and the feed forward controller, which performs iterative learning, may be adjusted simultaneously. An optimal controller may be adjusted to emphasize control based on qualities associated with the feedback controller, or alternatively adjusted to emphasize control based on feed forward control.

An iterative learning controller may take the form $$Hu_{i-1} + Le_{i-1} \qquad \text{Equation (8)}$$

where $u_{i-1}$ represents a previous input and $e_{i-1}$ represents a previous error.

A feedback controller may take the form $$QY^* = Fu_i + Ge_i \qquad \text{Equation (9)}$$

where $u_i$ represents a current input and $e_i$ represents a current error.

In the feedback controller, F relates to current cycle input feedback and G relates to current cycle error feedback. Regarding FIG. 5, a feedback controller 501 may perform feedback control in each iteration of the learning feed forward controller 503. The feedback controller 501 may incorporate feedback elements 511 including the ocean environment model 513. At each iteration i−1 521 of the feedback controller 501 values of L and H for the learning feed forward controller 503 may be provided. In each iteration, the feed forward controller 503 may provide an input into the feedback controller 501. At iteration i, the feedback controller 501 generates a control output $Y_i$ using iterations 531 of an ocean environment model 533. The feedback controller 501 may compensate for unknown disturbances $d_i$.

A cost function that may be used to optimize the combined controller may take the following form:

$$J = [e_i]^T S_1 [e_i] + [IQy_d]^T S_2 [IQy_d] + [\delta_i u]^T S_3 [\delta_i u] + [Y^* - OQY^*]^{ST} S_4 [Y^* - OQY^*]^S \qquad \text{Equation (10)}$$

where $S_1$, $S_2$, $S_3$, and $S_4$ are user defined parameters. $Y^*$ is a training matrix which is such that as the training matrix is able to estimate the disturbance environment, the better the feedback controller will be able to compensate for the unknown disturbances and will more accurately control. The training matrix $Y^*$ may be composed of a desired reference signal $y_d$, an estimate $\hat{d}$ of the repeating disturbance, an estimate $\hat{\delta}d$ of the iterative change in the current cycle disturbance, and a sinusoidal disturbance rejection matrix, $\sin(2\pi ft)$. The sinusoidal disturbance rejection matrix is composed of appropriately selected frequencies f to reject disturbances with content in the band surrounding those frequencies, according to the following:

$$f = [f_1, f_2, f_3, \ldots] \qquad \text{Equation (11)}$$

$$t - kT \text{ for } k = [0, 1, 2, \ldots, p-1]^T \qquad \text{Equation (12)}$$

The number of sinusoidal disturbance rejection frequencies that should be used is any number that may be necessary to reject random disturbances over a desired band of frequencies. The estimate $\hat{d}$ of the repeating disturbance, estimate $\hat{\delta}d$ of the iterative change in the current cycle disturbance, and estimate $\hat{f}$ to cover the random disturbance spectrum, can be obtained using any estimation technique, such as basic least squares or Kalman filters. The more accurately these estimates represent the operating environment, the better the overall Learning SONAR System will perform.

An aspect of the Learning SONAR System is the simplified manner that a desired mission can be specified to configure a controller. A user may designate a desired mission by defining a few mission requirements, which are represented internally as parameters of the cost function. The Learning SONAR System implementation intelligently generates a precise 3D velocity and altitude reference by learning through interactions with its local ocean environment. The mission requirements may be scaling values that specify how learning will be conducted. For example, a desired mission that is for covert operation may require low spatial sampling and increased sensitivity. A mission that is for normal operation may allow wider sound with low sensitivity. A mission may involve tradeoffs between power requirements and accuracy. A few specific scaling values may be input and used by the cost function and serve to define emphasis on feedback control versus learning feed forward control.

Figure 6:
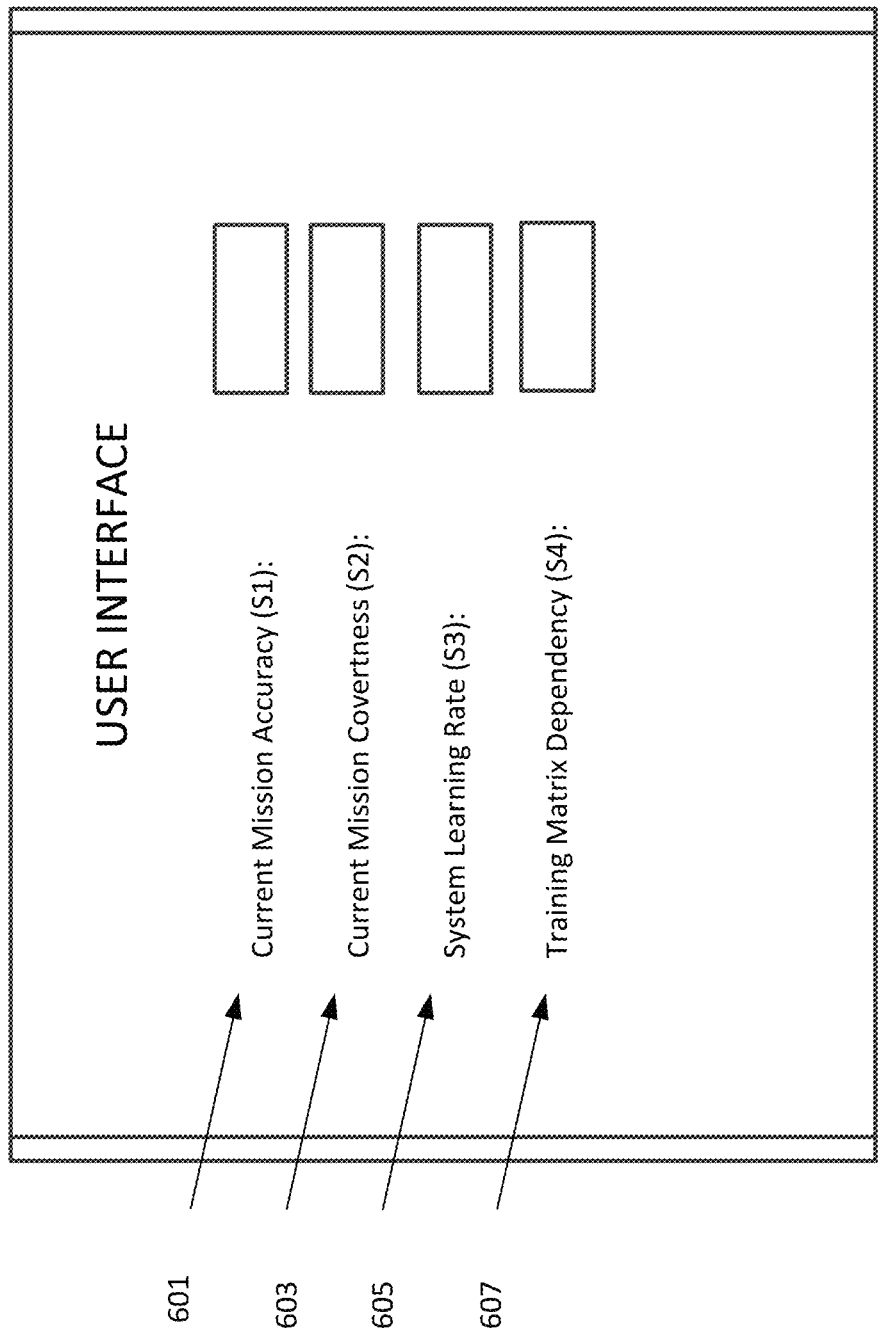
FIG. 6 illustrates a user interface for the terminal 130 of FIG. 1.

FIG. 6 is an embodiment of an input user interface for inputting mission requirements. In the embodiment, the scaling values may include (S1) current mission accuracy 601, (S2) current mission covertness 603, (S3) system learning rate 605, and (S4) training matrix dependency 607. These scaling values are used to weight the cost function according to current mission requirements. In turn, the cost function will optimize the controller, for individual missions, without any need for any hardware or software changes. Other scaling values may include spatial resolution, power requirements and a cost value.

Figure 7:
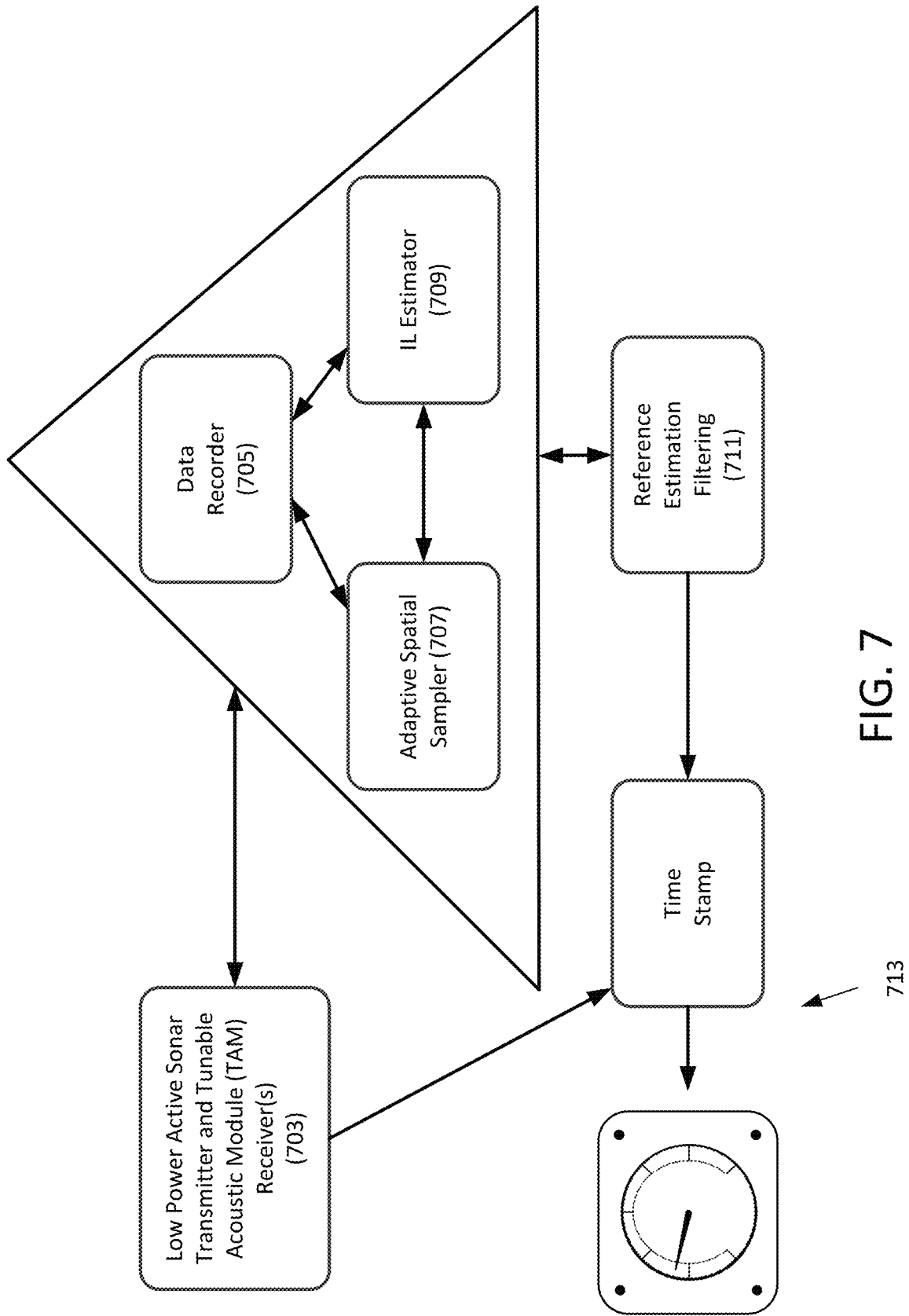
FIG. 7 is a block diagram of fundamental modules of the Learning SONAR System in accordance with exemplary aspects of the disclosure.

The Learning SONAR System implementation may be configured as software/hardware modules that are executed in the controller 101. FIG. 7 is a block diagram of modules of the Learning SONAR System in accordance with exemplary aspects of the disclosure. The modules may include a Transmit/Receive (T/R) Data Acquisition module 703, a data recorder 705, an adaptive spatial sampler (Adaptive SS) 707, an Iterative Learning (IL) Estimator 709, and reference estimation filtering 711. The user interface 713 may be performed in an external terminal 130.

The Transmit/Receive (T/R) Data Acquisition module 703 may control both transmitter 109 and receiver 107 hardware which is either leveraged from the host platform 120 or part of the controller 101 sensor array. This module will initialize the Learning SONAR System by defining the transmit waveform, for developing the ocean environment model or generating the first estimates and receiving the corresponding echo returns. Control signals used by the transmitter 109 are generated by the IL Estimator 709 (described below) executed in the controller 101. The T/R Data Acquisition module 703 will acquire echo signals by utilizing every individually accessible portion of a Tunable Acoustic Module (TAM) receiver array. This is done in order to maximize the spatial sampling offered by the receiver hardware 107. Each of the individual return signals are stored in a data recorder 705 for further processing by the IL Estimator 709 during the current iteration and for future reference by later iterations.

The Data Recorder module 705 may record all critical data and information for each iteration. The Data Recorder module 705 may consist of hardware, such as a disk drive unit, solid state memory device, or the like, and a Central Processing Unit (CPU) for designated data management tasks. In this capacity, it operates as the overall data manager and memory bank for the Learning SONAR System and the recording hardware may be one of two sets of hardware at the very core of the Learning SONAR System, the other being the controller 101. The data recorder module 705 must make all previous iteration data and information available to the current iteration to enable learning to occur and to maximize robustness of the Learning SONAR System to varying ocean environment conditions. With this module, learning and optimization are possible making the Learning SONAR System an intelligent sensor system.

The Learning SONAR System Controller 101 may be a second hardware part. The Controller 101 controls the Learning SONAR System in a fashion that is complimentary to the data recorder and its operation as the overall data manager and memory bank for the Learning SONAR System. The Controller 101 may control and execute aspects of the Learning SONAR System, including data acquisition, data recording, adaptive spatial sampling, iterative learning estimation, reference estimation, and all internal and external communication. The controller 101 may optionally be implemented with a GPU 231 to enable parallel execution of complex mathematical operations in real time.

An adaptive spatial sampler (Adaptive SS) 707 builds a synthetic receive array (SRA) map (P) which takes all available TAM receiver array signals for a current iteration and adaptively generates spatially sampled signals, with acoustic center locations, to meet the estimation criteria given by the IL Estimator 709. When generating map P, the Adaptive SS 707 takes into account desired array gain and signal to noise ratio, as well as all receiver information from the last iteration, including the map P used. Based on input information that the Adaptive SS 707 has available to it, it will utilize several SRAs, which it specifies sizes and acoustic centers for, to best achieve the estimation criteria. The estimation criteria varies from task to task, for example, to locate leading edges of return pulses the SRA will almost always utilize the TAM, or TAMs, in its entirety.

Iterative Learning (IL) Estimator 709 optimizes controller performance for the next iteration based on user specified mission requirements (for example, as in FIG. 6, above) and prior iteration performance. Fundamentally, IL Estimator represents a SONAR Expert-in-the-Loop with control technology that will operate and control using Machine Learning (ML), Iterative Learning Control (ILC), and Feedback Control (FBC). In order for the IL Estimator to achieve optimal performance, it requires access to the following input, model, and parameter information:

1) User defined mission requirements from user interface.
2) Ocean environment model (O) critical for initialization and learning. Generic ocean models can be stored in memory for initial or general use, but for optimal performance the IL Estimator will typically need to build an ocean environment model.
3) SRA map (P) critical for Adaptive SS and Learning SONAR System operation.
4) All prior iteration parameter information, including prior platform velocity, altitude, transmit power level, maximum correlation value, transmit waveform used, total number of pulses transmitted, and number of pulse pair estimates generated, and any other parameter information that is output for an iteration.

Reference estimation filtering 711 is integral to maximize controller accuracy and precision. This module takes the individual 3D velocity and altitude estimates generated in each iteration by IL Estimation and filters it to improve the accuracy and precision of the final 3D velocity and altitude reference output provided by controller 101 to the host platform 120. The filtering scheme used by this module may vary from application to application and depends heavily on the other hardware and sensors available on the host platform 120, which can be leveraged by the controller 101, in addition to the overall mission requirements. Therefore, the scheme can range in complexity from a simple moving average to a low-pass filter to a Kalman filter or even to a Morphological Filtering Algorithm (MFA). Regardless of filtering scheme, reference estimation filtering 711 is necessary to achieve the best results possible. In one embodiment, MFA is used to improve accuracy of altitude and another filtering scheme may be used improve accuracy of 3D velocity.

Figure 8:
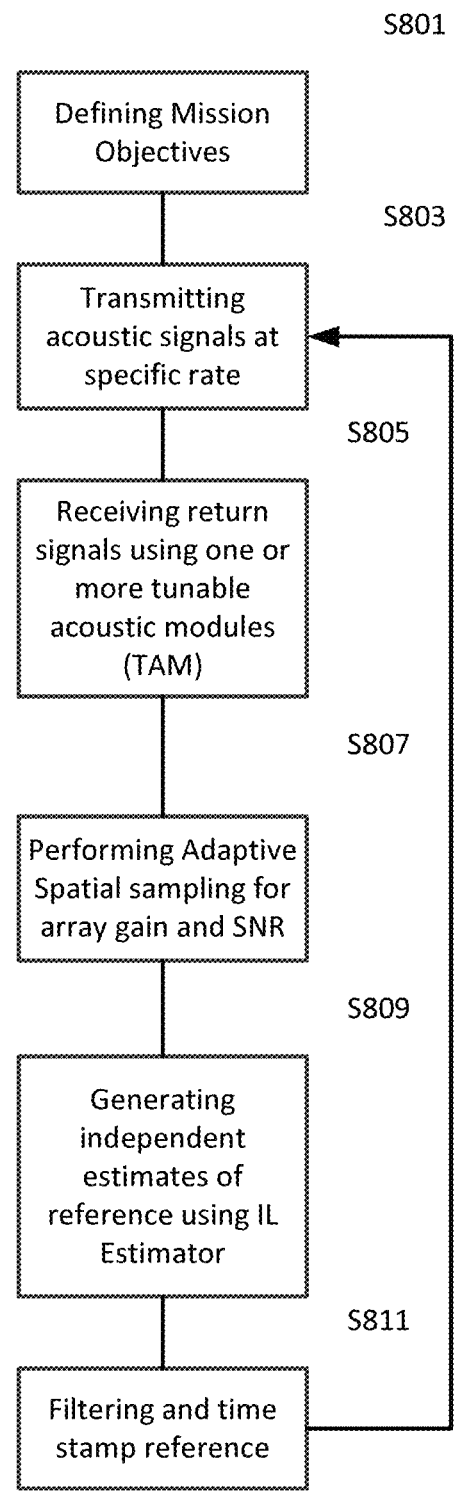
FIG. 8 is a flowchart for high-level operation of the modules of FIG. 7.

FIG. 8 is a flowchart for high-level operation of the modules of FIG. 7. More specific details of operation of each module will be described later. A user first enters scaling values, in S801, such as those shown in the user interface of FIG. 6, and the Learning SONAR System takes over to adapt and learn control actions based on the mission required scaling values. In some embodiments, the scaling values may be adjusted based on an assessment of the echo return signals. The Learning SONAR System implementation begins operation by, in S803, transmitting pulsed acoustic signals at a specific rate. In S805, return pulsed signals are received using one or more TAMs. The Adaptive SS 707 performs, in S807, adaptive spatial sampling for a desired array gain and signal-to-noise ratio (SNR), as defined by the IL Estimator based on the input mission requirements and its own processing, necessary to generate the transmit waveform. In S809, the IL Estimator 709 generates independent estimates of reference 3D velocity and altitude. In S811, the reference estimation filtering 711 performs filtering, and a time stamp is applied to the reference 3D velocity and altitude. Performance parameters generated by the IL Estimator 709 are transmitted for use in the next iteration beginning with transmitting another round of acoustic signals at S803.

Figure 9:
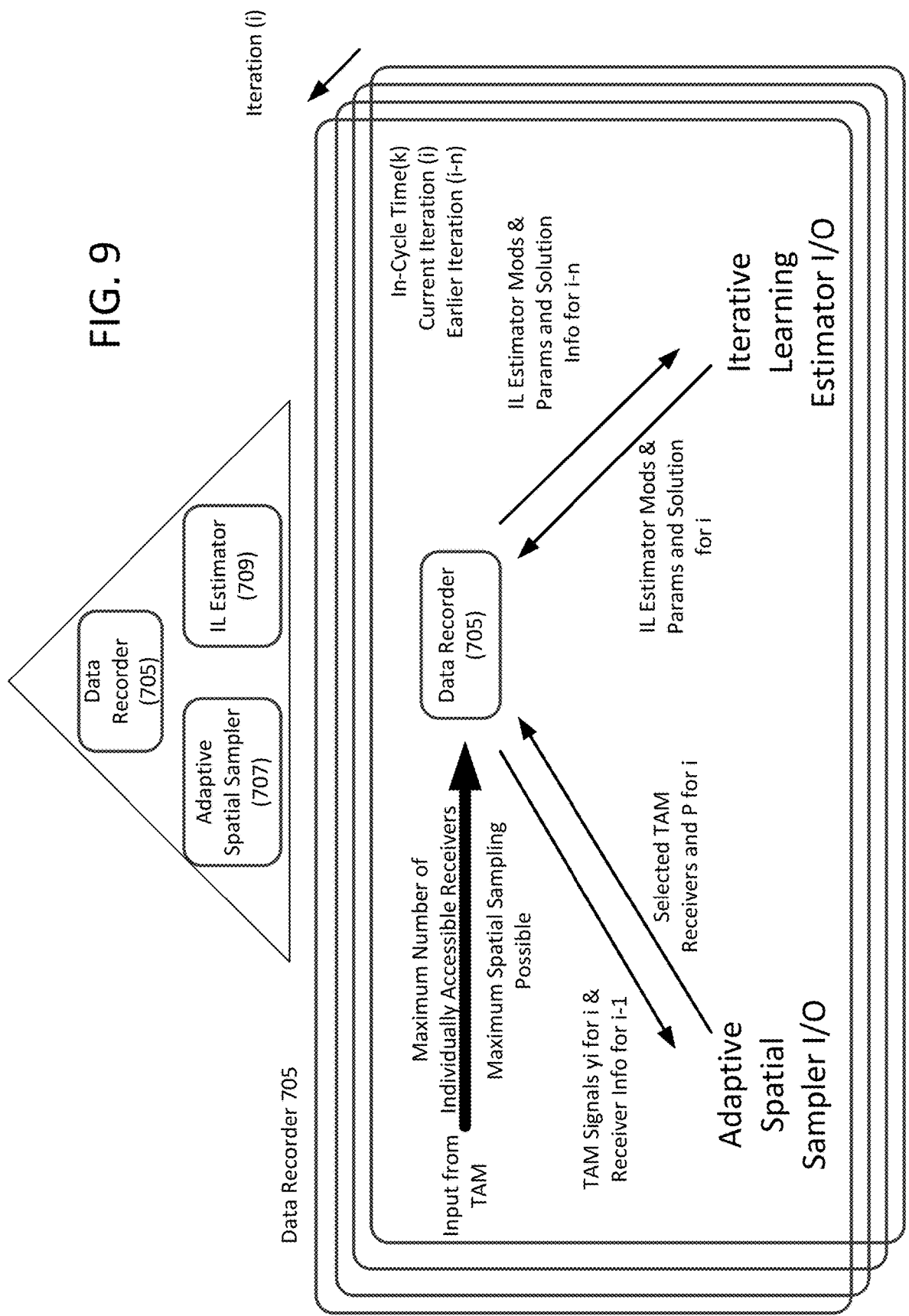
FIG. 9 is a view of the data recorder of FIG. 7.

FIG. 9 is a view of the data recorder of FIG. 7. The data recorder 705 records data at each iteration of the Learning SONAR System and may provide data from a previous iteration. Data received from the TAM may include the maximum number of individually accessible receivers, or smallest sensing elements, and the maximum spatial sampling possible. Data received from the Adaptive SS 707 may include a selected set of TAM receivers and map P for the current iteration. Data received from the IL Estimator 709 may include IL Estimator provided ocean environment model O, prior iteration parameter information, and solution (estimated precise 3D velocity and altitude) for the current iteration. The data recorder 705 may provide TAM signals yi for the current iteration and receiver information from a previous iteration to the Adaptive SS 707. The data recorder 705 may provide ocean environment model O, parameters, and solution information from a previous iteration to the IL Estimator 709.

Figure 10:
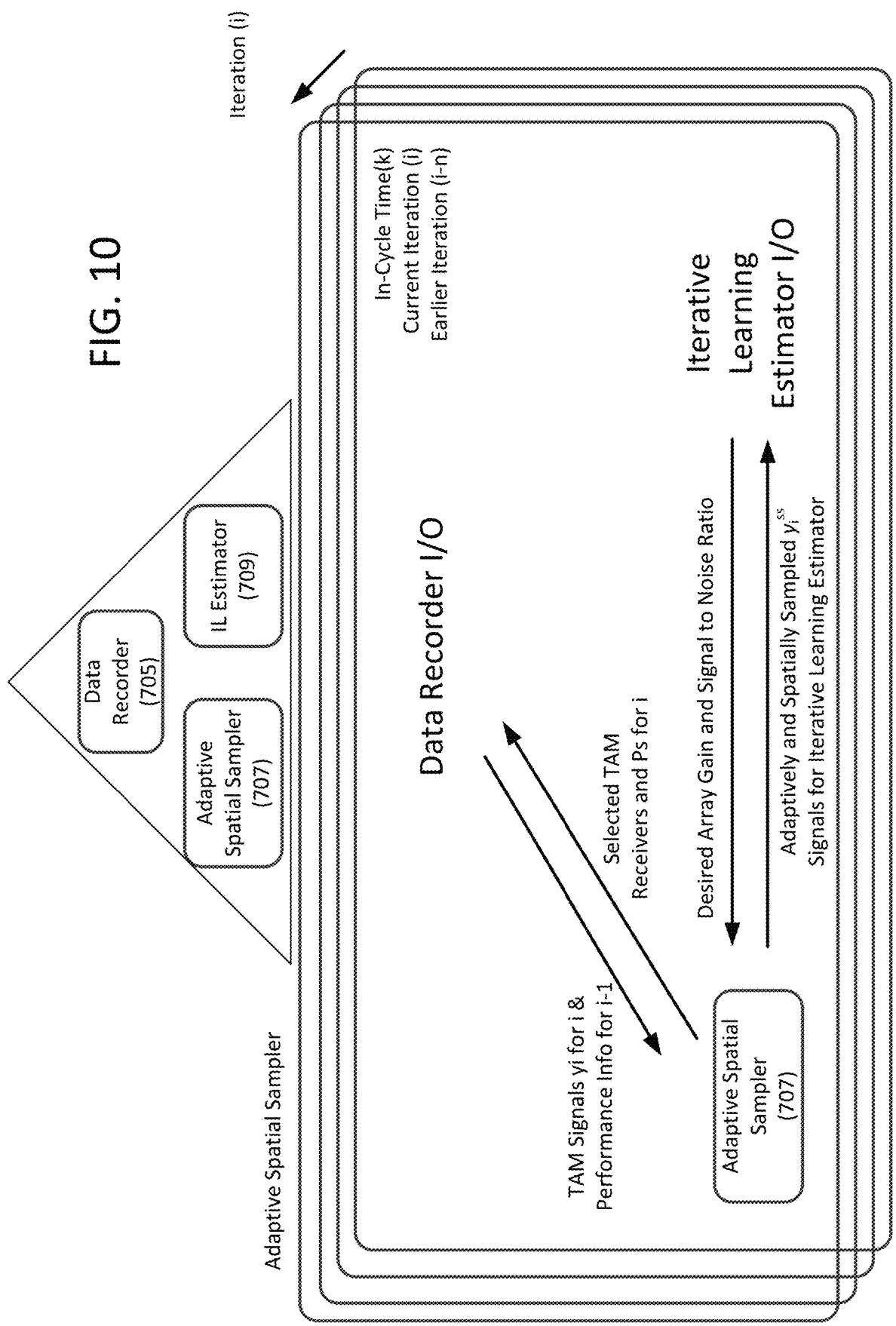
FIG. 10 is a view of the adaptive spatial sampler of FIG. 7.

FIG. 10 is a view of the Adaptive SS of FIG. 7. The Adaptive SS 707 obtains data from the data recorder 705 and provides data to the IL Estimator 709 at each iteration of the Learning SONAR System. In particular, the Adaptive SS 707 receives TAM signals yi for the current iteration and performance information from a previous iteration from the data recorder 705 and provides selected TAM receivers and SRA maps P for the current iteration. The Adaptive SS 707 receives a desired array gain and SNR from the IL Estimator 709 and generates adaptively and spatially sampled signals $y_i^{ss}$ for the IL Estimator 709.

An operation performed by the Adaptive SS 707 is to build a SRA map P which takes all available TAM signals yi, for iteration i, and generates adaptively and spatially sampled signals $y_i^{ss}$, with acoustic center locations, to meet the estimation criteria given by the IL Estimator. In generating map P, the Adaptive SS 707 takes into account desired array gain and signal to noise ratio, as well as all receiver information from the previous iteration including the map P used. Based on input information the Adaptive SS 707 has available to it, it will utilize several synthetic receive arrays, in which sizes are specified by defining dx, dy, and acoustic centers, to best achieve the estimation criteria. Furthermore, certain Learning SONAR System implementations may utilize a configuration of TAMs that will additionally allow for the specification of dz values. The ability to utilize receivers offset in the z, or downward looking, direction significantly increases the ability of the Learning SONAR System to provide precise velocity reference information in that direction.

A conventional SONAR system may be configured with a transmitting transducer and 12 receiving transducers mounted in a fixed square array, spaced apart by about 10 inches between receivers. The receivers have specific spatial positions. The position of these receivers is fixed and cannot be changed, resulting in fixed spatial sampling. In contrast, in one embodiment, a receiver array may include an array of receivers spaced about 1 inch from each other. In addition, the spatial resolution of the receivers may be varied in real time and the face center may be shifted. It is expected that receiver arrays may include a greater density of receivers with computer controlled spatial resolution.

Figure 11A:
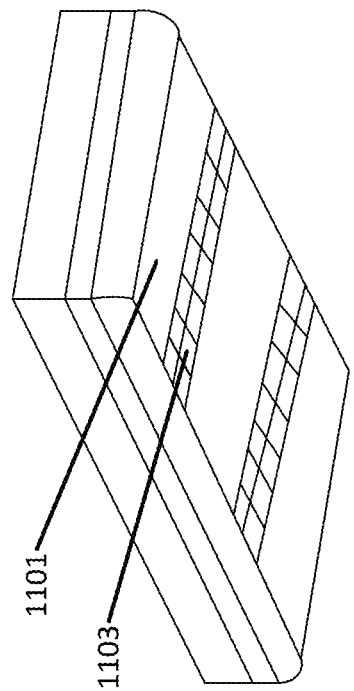
FIGS. 11A, 11B, 11C, and 11D are perspective view of a tunable acoustic module receive surface having various synthetic receive arrays.
Figure 11B:
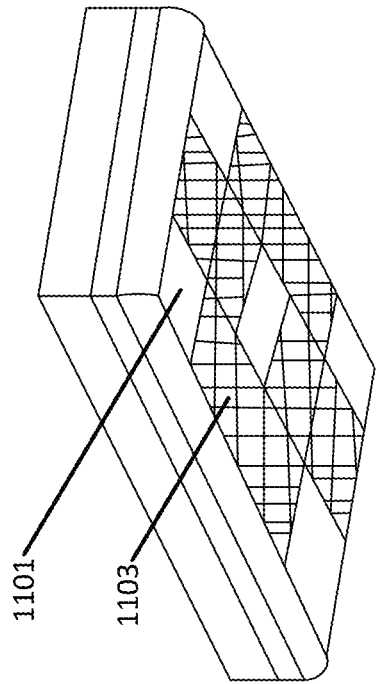
Figure 11C:
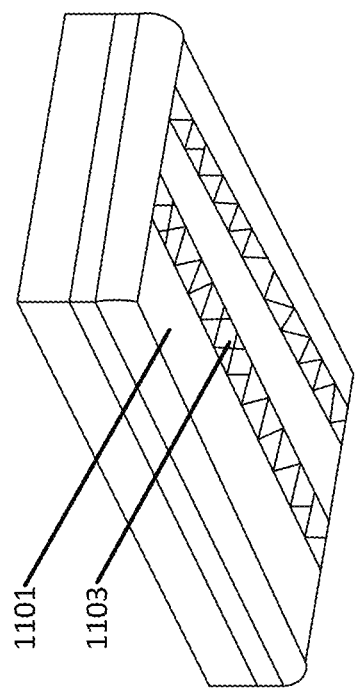
Figure 11D:
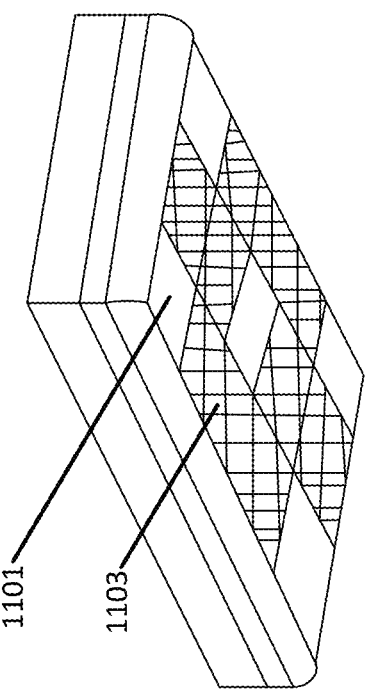

FIGS. 11A, 11B, 11C, and 11D are perspective views of a TAM receiver surface having various synthetic receive arrays. Spatial resolution may be varied by controlling the TAM. Acoustic signals, for example pulsed sinusoidal signals, are transmitted by one or more transmitters 109 at a specific rate and one or more TAMS 107 receive return signals. Synthetic receive arrays (SRA) 1101, positions of which are specified by defining dx, dy, in certain situations dz, and acoustic centers, are provided to the IL Estimator 709 to achieve the best estimation for the given criteria. The estimation criteria may be controlled for specific tasks. For example, as shown in FIG. 11A, to locate leading edges of return pulses the entire TAM receiver surface 1101 will almost always be used. Adaptive spatial sampling relates to a relationship between array gain and spatial resolution, where spatial resolution may be varied. Areas 1103 are spacing areas between active receiver arrays, in which the spacing area of receivers 1103 are not operated. FIGS. 11B, 11C, and 11D illustrate various SRA patterns to achieve increased spatial resolution. FIGS. 12A and 12B illustrate arrangement of TAM receivers in the z direction.

The IL estimator 709 determines leading edges for the pulses, typically using the maximum number of TAM receiver elements available. In obtaining a 3D velocity, the number of receiver elements used in the array will typically aim to maximize the spatial resolution and more finely sample the resultant correlation surface. Also, the Adaptive SS 707 enables the generation of more displacement vectors and potentially more efficient identification of the correlation peak. Increased spatial resolution also translates directly to improved redundancy. In obtaining altitude, maximum number of TAM receiver elements will typically be used unless the IL Estimator 709 determines some form of beamforming would be of benefit.

Figure 13:
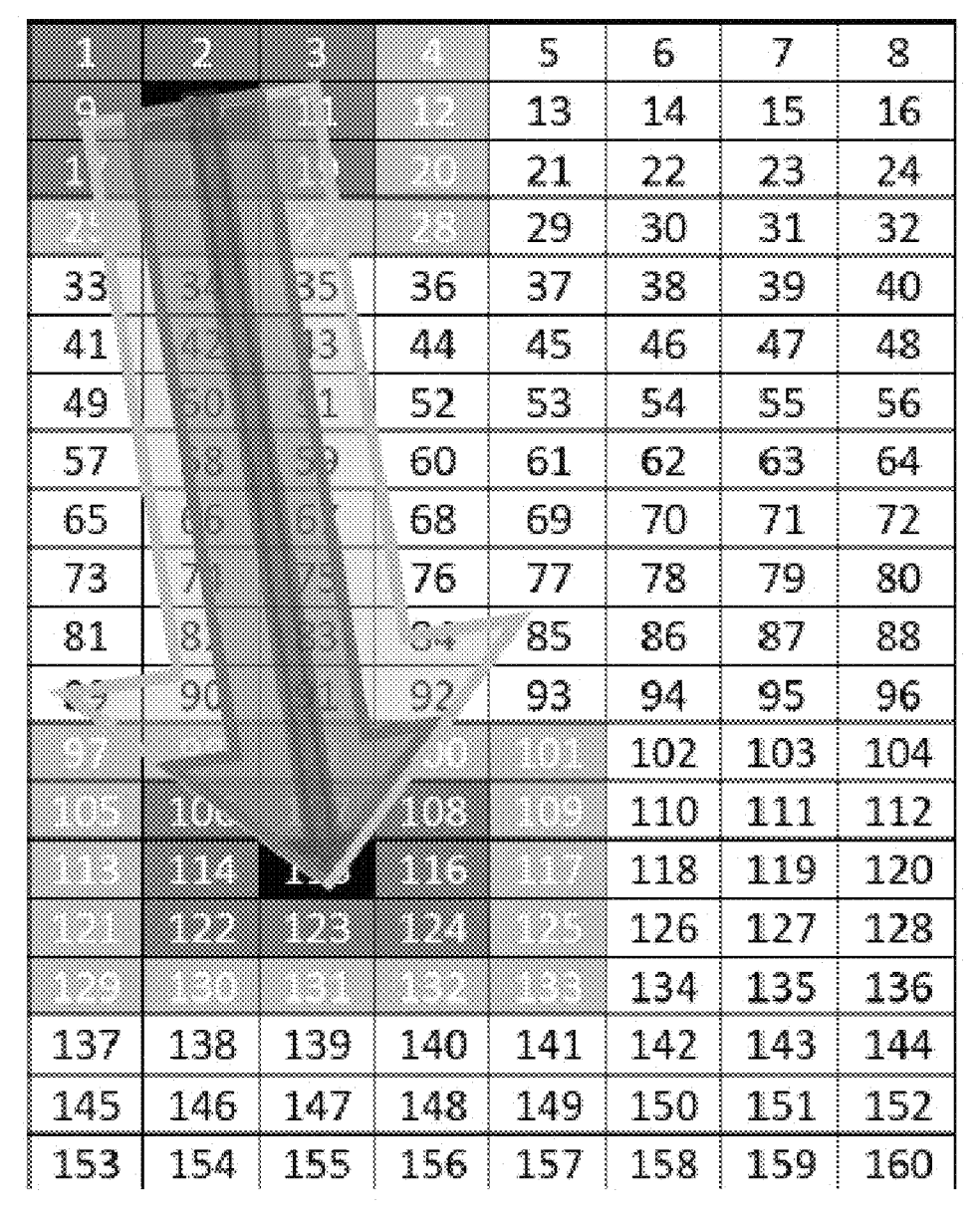
Figure 14:
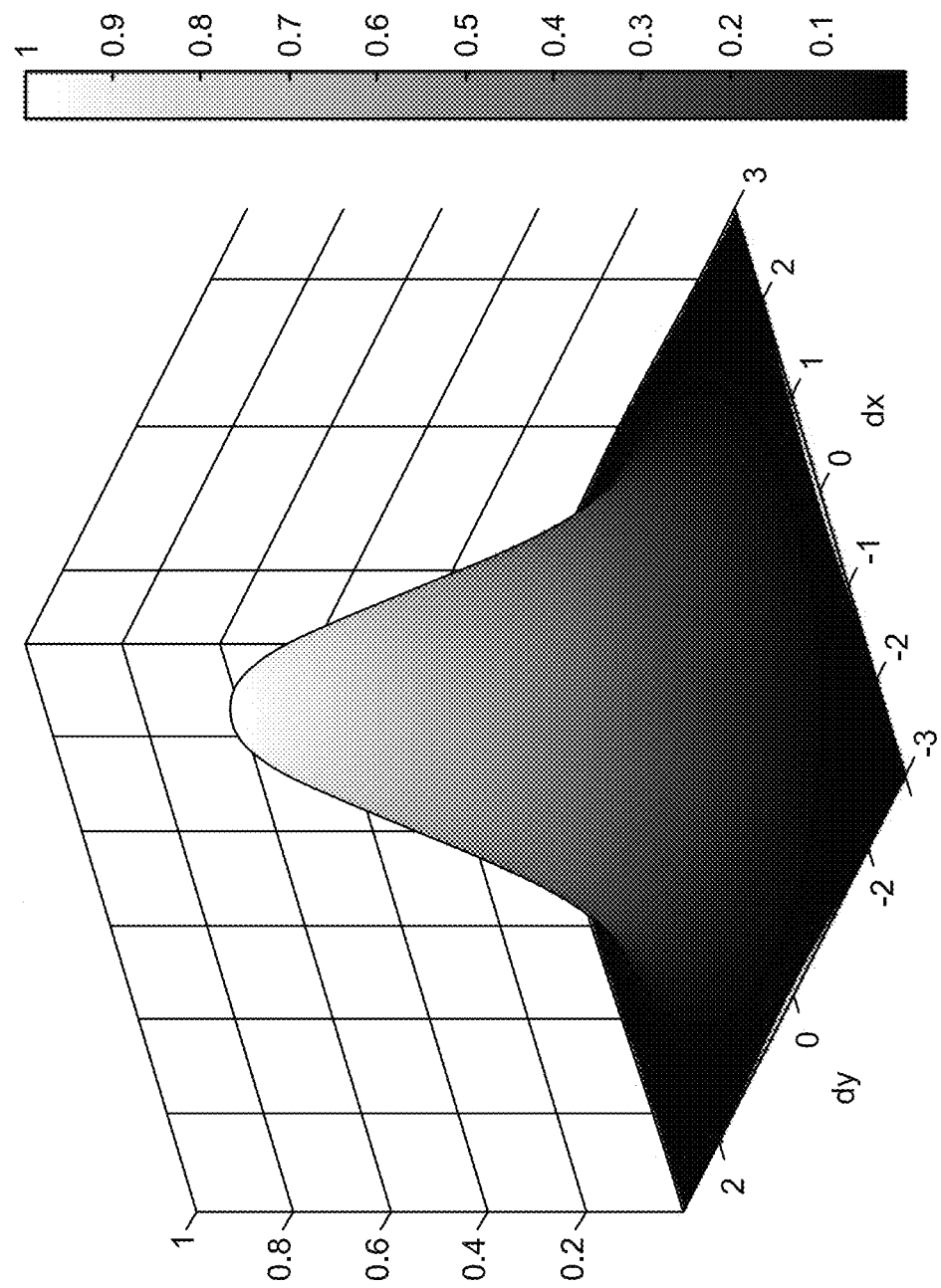
FIG. 14 illustrates a good correlation surface.

Incorporating adaptive spatial sampling into the Learning SONAR System enables a tradeoff between array gain and spatial resolution. For example, adaptive spatial sampling may allow high spatial resolution (i.e., large number of active receivers) which means a reduction in array gain, as each receiver takes a small portion of a signal. On the other hand, minimizing the number of receiver elements used in the array will maximize spatial resolution and more finely sample the correlation surface. Adaptive spatial sampling enables generation of more displacement vectors and enables more efficient identification of the correlation peak. FIG. 13 illustrates the tradeoff described above between spatial resolution and array gain, with varying partitions of individual elements (numbered 1-160 in this example) used to form various SRAs. For example, each individual element can be used separately to form an SRA of 160 receivers which will maximize the spatial resolution but minimize the array gain. If increased array gain is desired, individual receivers can be combined, for example a section of the TAM using 1, 2, 3, 9, 10, 11, 17, 18, and 19 as one receiver with an acoustic center at element 10 and another section of the TAM using 106, 107, 108, 114, 115, 116, 122, 123, and 124 as another receiver with an acoustic center at element 115, for an SRA with a different number of receivers. Using more elements in receivers will increase the array gain proportionally while simultaneously decreasing the spatial resolution. It can be seen that increasing the spatial resolution will facilitate identification of the correlation peak and likely improve the overall accuracy of the resulting estimates, assuming the spatial sampling is of a good underlying correlation surface. FIG. 14 illustrates an exemplary good correlation surface.

Figure 15:
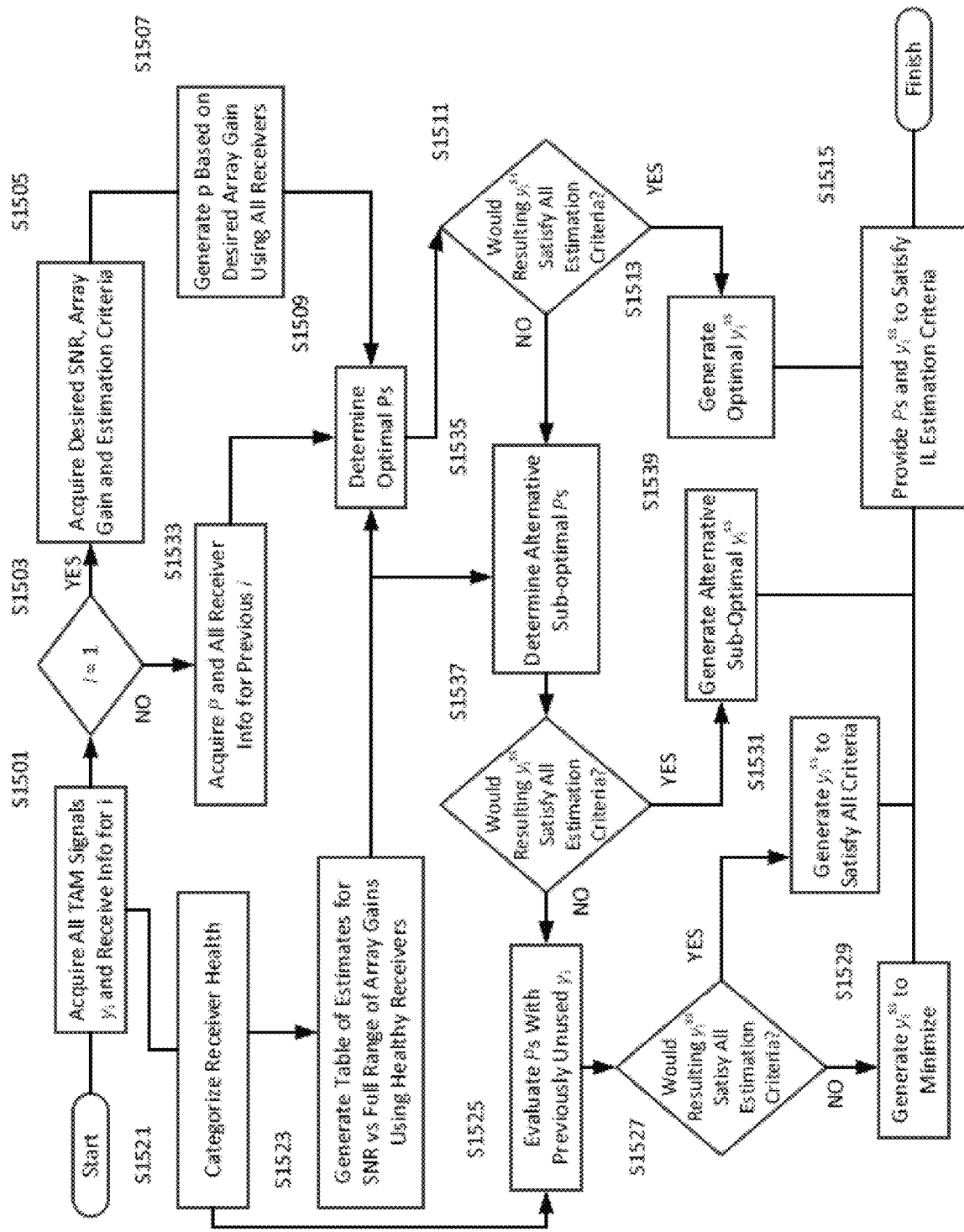
FIG. 15 is a flowchart for operation of the adaptive spatial sampler in accordance with an exemplary aspect of the disclosure.

FIG. 15 is a flowchart for the operation of the Adaptive SS 707. In S1501, the Adaptive SS 707 acquires all signals yi that the TAM receives and receiver information, for example receiver health, prior relative sensitivities, for iteration i. Initially, at i=1, YES in S1503, in S1505 a desired SNR, array gain and estimation criteria, for example estimating the leading edge of return pulses, estimating 3D velocity, estimating altitude, are acquired. In S1507, a map array P is generated based on the desired gain using all receivers. In S1535, optimal map arrays Ps are determined. Here, an optimal P is one that, given prior receiver information, desired SNR, array gain, and estimation criteria, provides maximum spatial resolution while still satisfying the requested desired SNR, array gain, and estimation criteria. In S1511, a decision is made to determine if the resulting $y_i^{ss}$ satisfies all estimation criteria. If it is determined that all estimation criteria has been satisfied (YES in S1511), in S1513 an optimal $y_i^{ss}$ is generated. In S1515, the optimal Ps and optimal $y_i^{ss}$ that satisfy the IL estimation criteria are provided by the Adaptive SS 707.

In later iterations (NO in S1503), in S1533 map array P and all receiver information for a previous iteration are acquired. Also, in S1521 the health of the receiver is determined, including whether there are receivers that are not operating, due to failure or malfunction. In S1523, a Table of Estimates for SNR vs full range of array gains using healthy receivers are generated. Further, in S1525, Ps with previously unused yi are evaluated.

In S1535, optimal Ps are determined based on P and all receiver information for a previous iteration acquired in S1533 and the generated Table of Estimates from S1523. In S1511, a determination is made weather $y_i^{ss}$ satisfy estimation criteria. If not (NO in S1511), alternative sub-optimal Ps are determined. If the Ps still do not meet estimation criteria (NO in S1537), in S1525, Ps are evaluated with previously unused yi. If all estimation criteria is satisfied (YES in S1537), in S1539 an alternative sub-optimal $y_i^{ss}$ is generated. In S1527, a decision is again made to determine whether all estimation criteria have been satisfied. If all estimation criteria have been satisfied (YES in S1527), in S1531, $y_i^{ss}$ to satisfy all criteria is generated. If estimation criteria have not been satisfied (NO in S1527), in S1529 $y_i^{ss}$ to minimize criteria is generated. In S1515, Ps array and $y_i^{ss}$ to satisfy IL estimation criteria is provided based on a $y_i^{ss}$ generated to minimize criteria of S1529, a generated $y_i^{ss}$ of S1531, or an alternative sub-optimal $y_i^{ss}$ of S1531.

The Iterative Learning (IL) Estimator 709 may serve the role of a SONAR expert, to operate and control the Learning SONAR System. The Learning SONAR system implementation is such that a user enters mission requirements into a user interface and the IL Estimator 709 takes over and operates the system. The IL Estimator 709 controls the Learning SONAR System using machine learning (ML), iterative learning control (ILC), and feedback control (FBC). As described with respect to FIG. 5, the feedback control incorporates an ocean environment model that may be determined using ML. A cost function is used to balance ILC and feedback control based on user specified mission requirements. An aspect of the IL Estimator 709 is that it performs iterative optimization of the cost function as in FIG. 5. The iterative optimization determines the transmit signal to be projected into the water based on the controller, in the form of the F, G, H, and L matrices, and the ocean environment model O, which is also iteratively updated. Once the transmit signal is determined based on F, G, H, L, and O, it is sent to the transmitter array 109 to be projected into the water and the echo returns are captured using the TAM (receiver array 107). Once each of the individual TAM returns are captured, adaptive spatial sampling is performed in-cycle as requested by the IL Estimator 709 and the appropriately spatially sampled signals are provided to the IL Estimator 709 to generate the estimates of 3D velocity and altitude.

Figure 16:
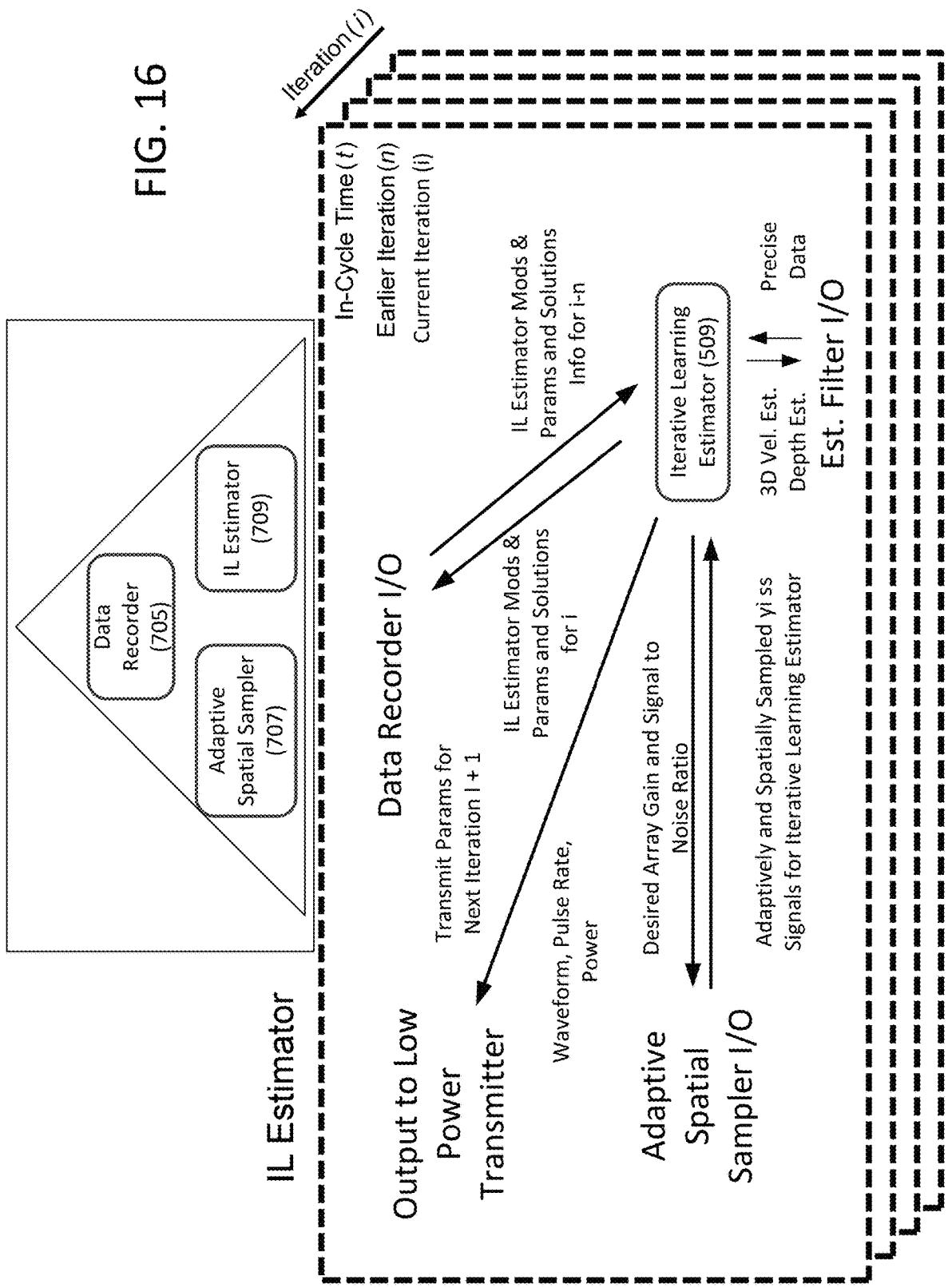
FIG. 16 is a view of the IL Estimator of FIG. 7.

FIG. 16 is a view of the IL Estimator of FIG. 7. The IL Estimator 709 transmits parameters for a next iteration i+1 to the transmitter array 109. The parameters may include waveform type, pulse rate, and transmit power level. The IL Estimator 709 may transmit a desired array gain and SNR to the Adaptive SS 707. The IL Estimator 709 may receive adaptively and spatially sampled $y_i^{ss}$ signals from the Adaptive SS 707, and IL Estimator models, parameters, and solutions information for a previous iteration i−n. The IL Estimator 709 may send 3D velocity estimation and altitude estimation to a filter in order to receive precise 3D velocity and altitude.

Figure 17A:
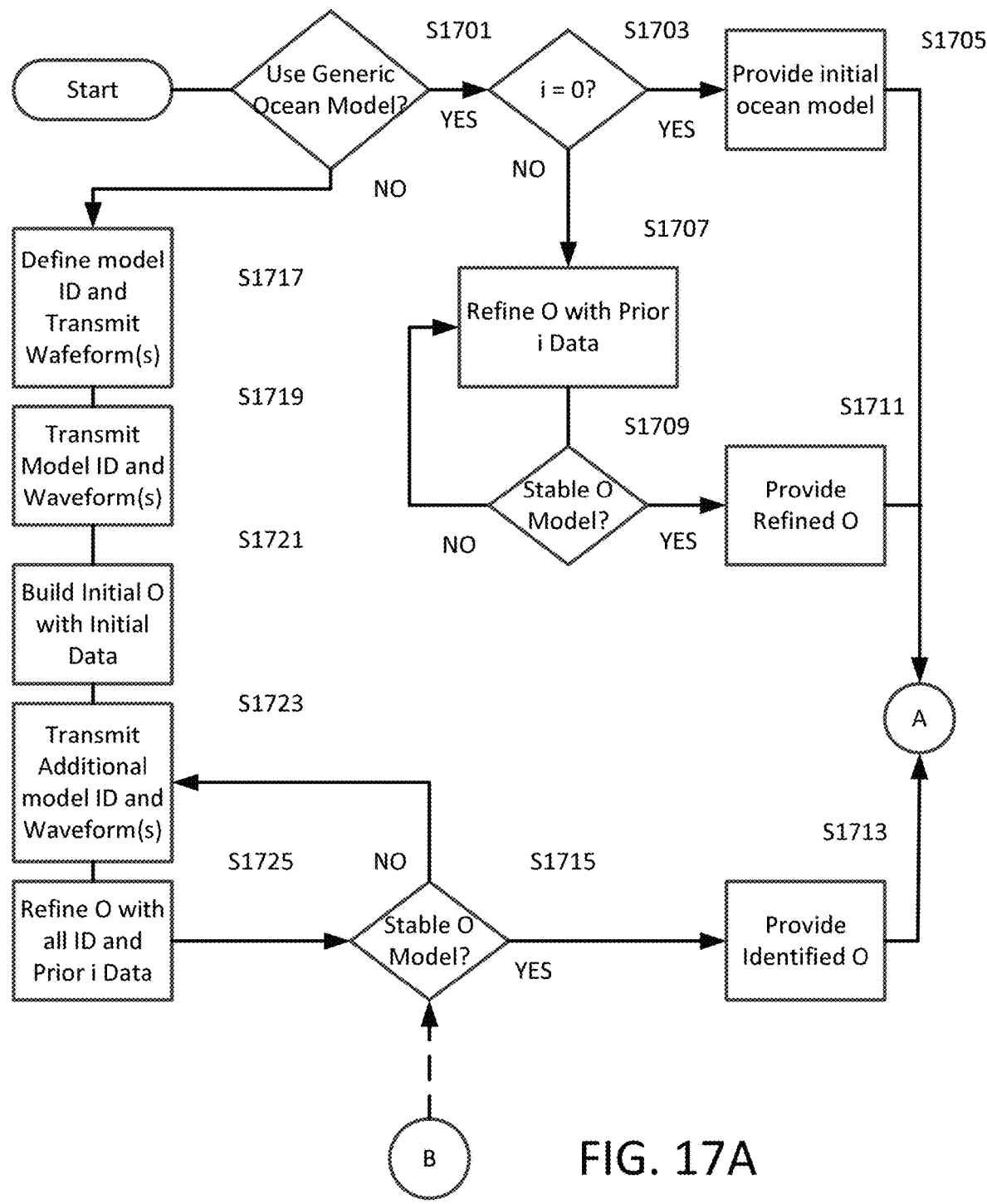
FIGS. 17A, 17B are a flowchart for operation of the IL Estimator in accordance with an exemplary aspect of the disclosure.
Figure 17B:
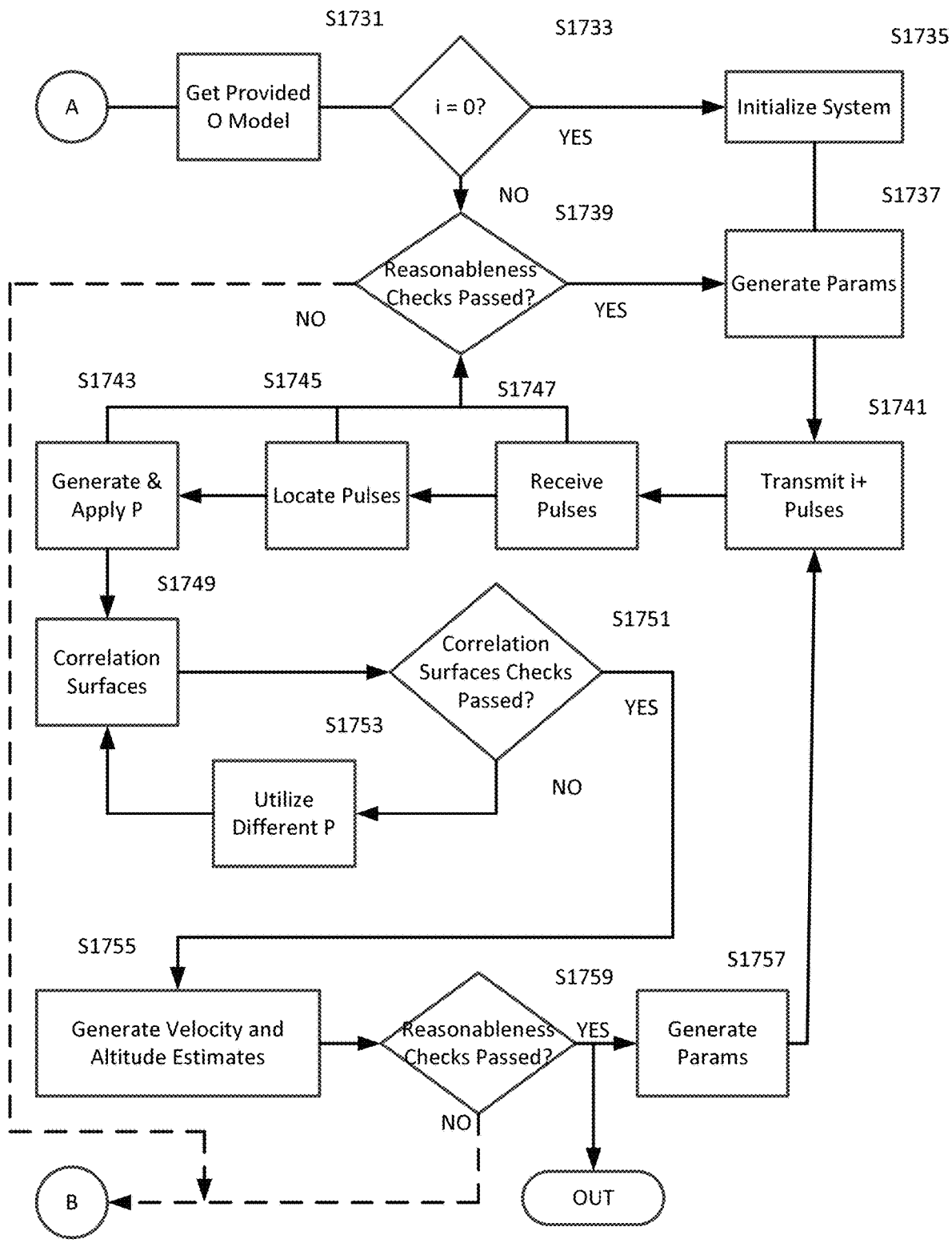

FIGS. 17A, 17B are a flowchart for operation of the IL Estimator in accordance with an exemplary aspect of the disclosure. IL estimation may begin with a generic ocean environment model O.

Figure 18:
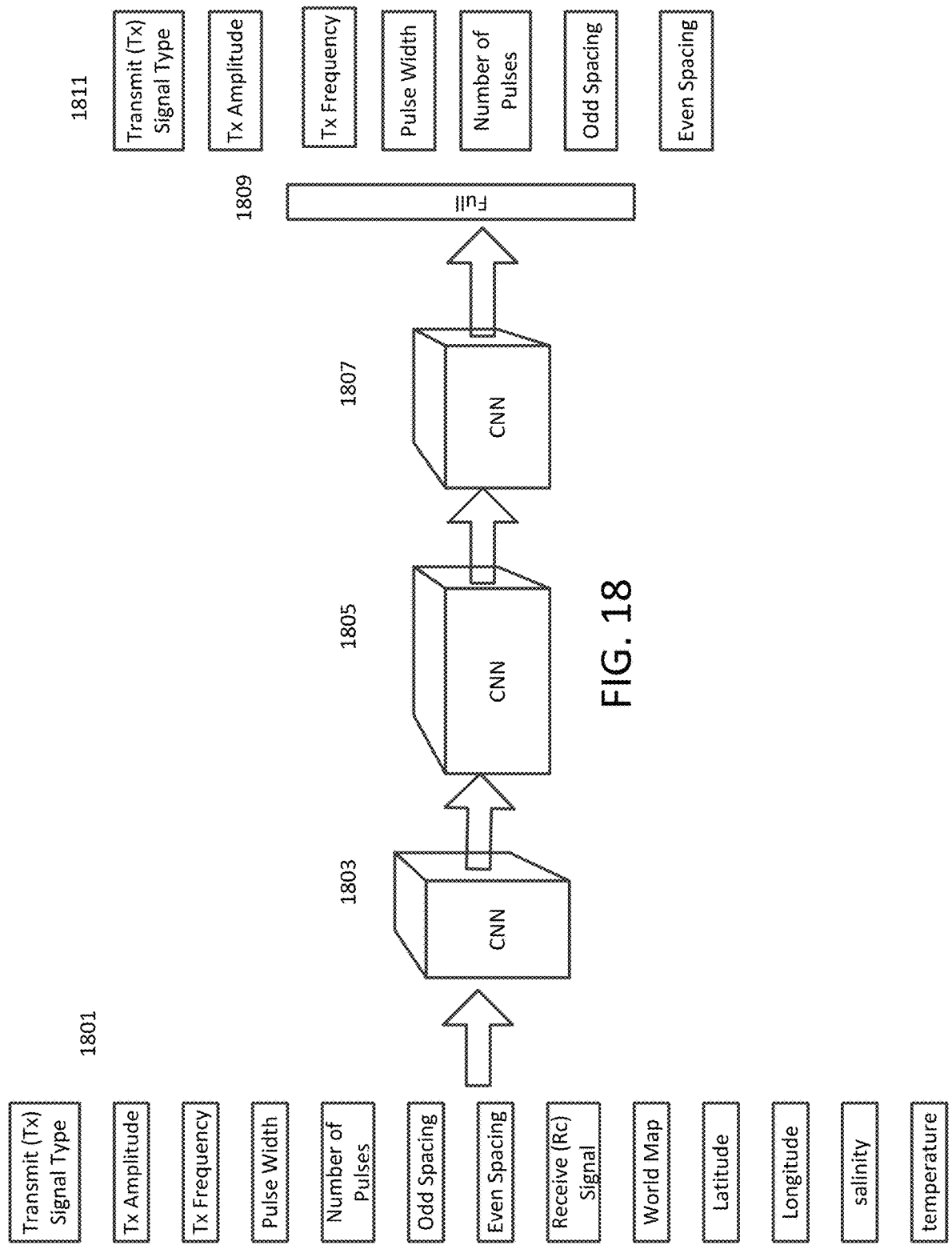
FIG. 18 is a block diagram of a convolution neural network architecture in accordance with an exemplary aspect of the disclosure.

FIG. 18 is an exemplary ocean environment model implemented as a convolution neural network (CNN) architecture. A CNN is suitable for the ocean environment as the transmit signals are temporal and the signals vary temporally and spatially. The convolution neural network architecture may be implemented as a deep neural network with multiple hidden layers 1803, 1805, 1807. Convolution neural networks were inspired by biological processes in that the connectivity pattern between neurons resembles the organization of the animal visual cortex. Individual cortical neurons respond to stimuli only in a restricted region of the visual field known as the receptive field. Each convolutional neuron processes data only for its receptive field. The convolution operation brings a solution to the problem of processing power for a large number of neuron connections as it reduces the number of free parameters, allowing the network to be deeper with fewer parameters.

The layers 1803, 1805, 1807 of a Convolution Neural Network have neurons arranged in three dimensions. The neurons in a layer are connected to only a small region of the previous layer, which is the receptive field. Distinct types of layers are stacked to form a Convolution Neural Network architecture. Convolution Neural Networks exploit spatial locality by enforcing a local connectivity pattern between neurons of adjacent layers. The architecture includes nonlinear filters that become increasingly global (i.e., responsive to a larger region of pixel space) so that the network first creates representations of small parts of the input, then from them assembles representations of larger areas. The Convolution Neural Network may include a final fully connected layer 1809.

In one embodiment, the convolution neural network may include input features that characterize a spatial/temporal transmit signal. The transmit signal for the ocean environment model may be for a predetermined duration, number of pulses, or signal length. The input features 1801 may include transmit signal type, transmit amplitude, transmit frequency, and pulse width. The pulse width is defined as the time duration of the actual transmit pulse. The input features 1801 may further include a number of pulses for any given transmission, odd pulse spacing, and an even pulse spacing. Odd pulse spacing is the time spacing between the first pulse and the second pulse, the third pulse and the fourth pulse, etc. In other words, the odd pulse spacing is a chain between pulse pairs starting with odd pulses, such that for a chain of seven pulse returns, the odd pulse spacing would be the spacing between the pulse pairs (1,2), (3,4), and (5,6) for example. The spacing between pulse pairs (2,3), (4,5), and (6,7) would be even pulse spacing. The choice of spacing may be arbitrary and would be used to characterize the actual signal that would be returned.

The input features 1801 may include the received return signal. In some embodiments, the return signal may be classified as a category, or type, of return signal such as the return types shown in FIG. 4.

The input features 1801 may include a world map that can help in parameter definition depending on the type of application and depending on the type of map that is available. A world map may be highly classified or unclassified. World maps may give the CNN clues as to the environment that the CNN may be dealing with.

The input features 1801 may include current latitude and longitude to hone into for a particular area on the map. The input features 1801 may include ocean environment characterizes including salinity and temperature.

The output features 1811 of the CNN will be the type of transmit signal that should be used. The output features 1811 may include features that are comparable to the input features, including transmit signal type, transmit amplitude, and transmit frequency; depending on the type of signal—a chirp signal or something similar, the transmit frequency may be an electric frequency range, if it is a simple tone. For example, the transmit frequency may be the frequency that the tone should be, or may include Gaussian signals, or some arbitrary signal that is not defined.

The output features may further include a pulse width, a number of output pulses, and even and odd spacing. The output features should be sufficient to help the system define the transmit signal that should be used for the ocean environment. An ocean environment model should help to obtain these features, especially in situations where a return signal is not good and would be difficult to correlate. For example, in the case that the return signal is a weak signal, an improvement may be achieved by increasing the transit amplitude. Subsequently, an improved transmit signal may be transmitted having an increased amplitude. In another case where the return signal is a specular signal, an improved transmit signal may be one having reduced amplitude and increased frequency. The decision to increase or decrease amplitude or increase frequency, or other adjustments in the transmit signal, may be made using the ocean environment model.

Figure 19:
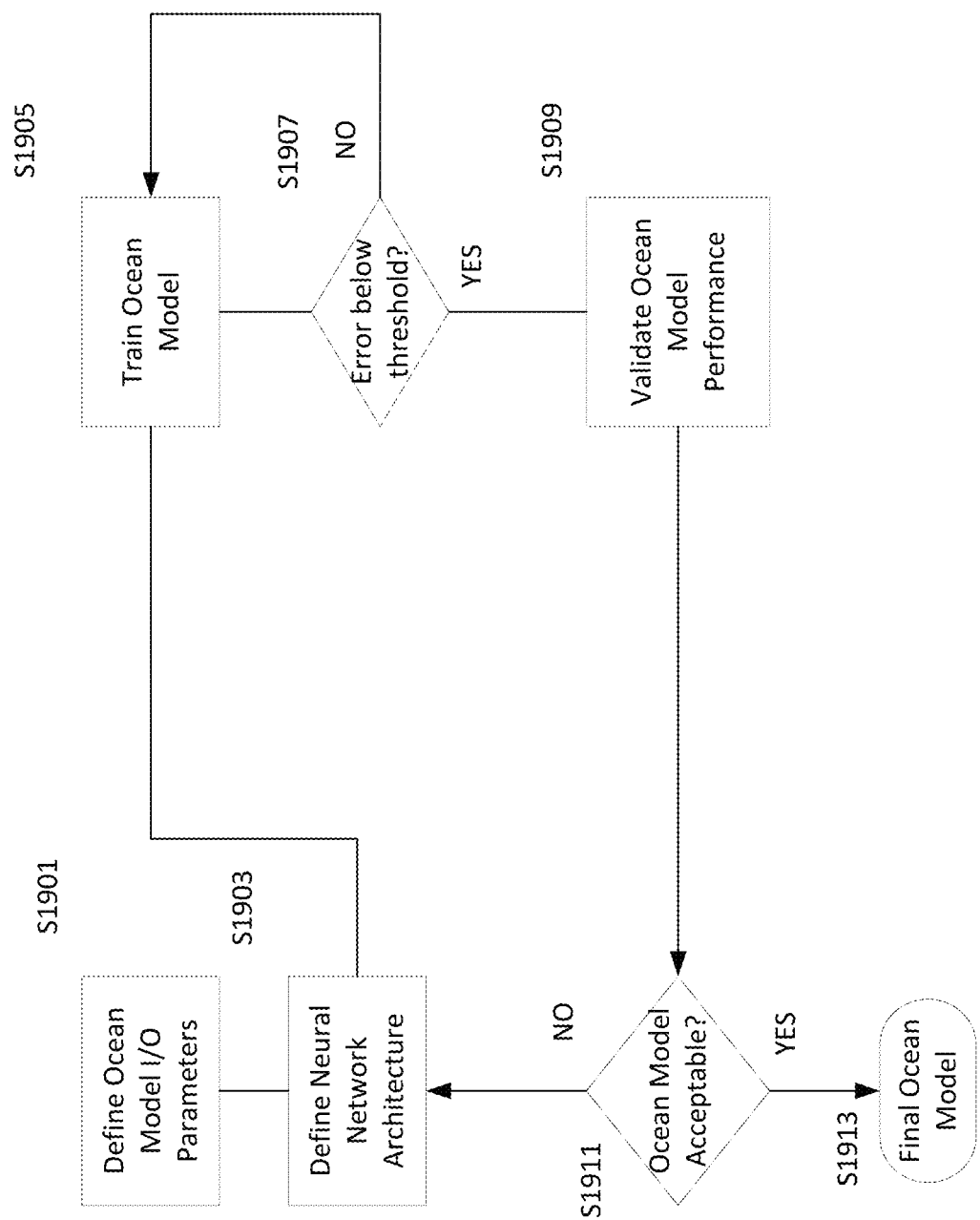
FIG. 19 is a flowchart of a method of training a machine learning system for the ocean environment model.

FIG. 19 is a flowchart for supervised learning to generate an ocean environment model. Initially, in S1901, a training model is set up by defining the inputs and outputs as ocean environment model parameters. In S1903, an architecture for a neural network may be defined in terms of the structure of the hidden layers, including the arrangement of neurons in each layer. In S1905, the training model is then trained using examples of inputs and outputs until a desired error level is met (YES in S1907). In S1909, the trained ocean environment model may be tested to determine, in S1911, if it meets desired performance with unknown data. If the trained ocean environment model does not meet expected performance levels (NO in S1911), changes may be made to the architecture of the neural network, and the revised network architecture may again, in S1905, undergo a training process. Otherwise (YES in S1911), in S1913, the trained ocean environment model may be deployed as an initial ocean environment model.

Figure 20:
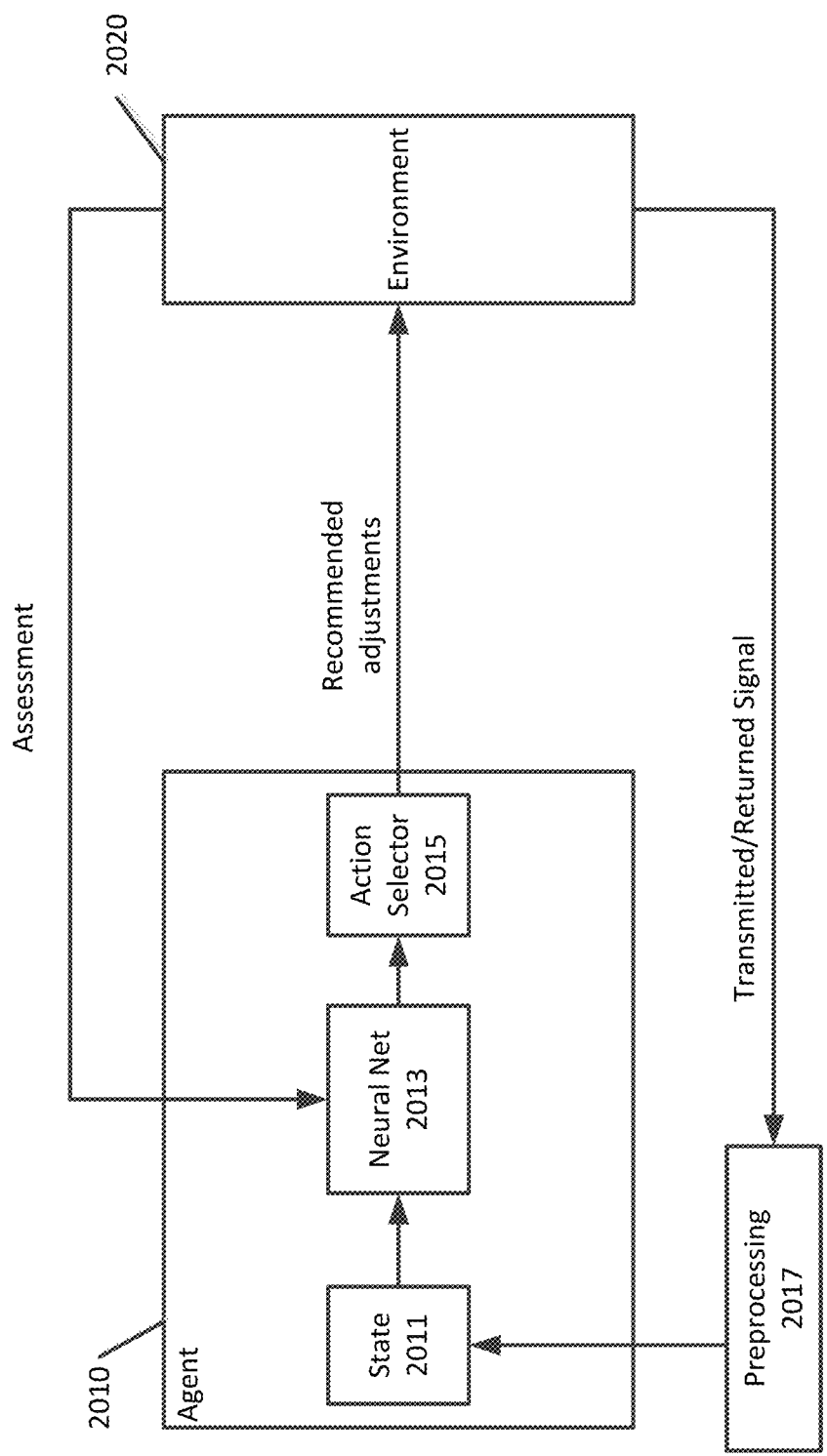
FIG. 20 is a block diagram for a reinforcement learning system for the ocean environment model in accordance with an exemplary aspect of the disclosure.

In one embodiment, the ocean environment model may undergo continuous learning, by for example, reinforcement learning. FIG. 20 is a block diagram of a reinforcement learning system for the ocean environment model in accordance with an exemplary aspect of the disclosure. Using reinforcement learning, the ocean environment model 2013 is provided with a good or bad rating (assessment) based on how well the previous ocean model's instruction (recommended adjustments) improved the return signal. The environment 2020 is the adjusted transmit signal and echo returned signal. In some embodiments, the adjusted transmit signal and the return signal may undergo preprocessing 2017 to form the input feature vector (representative state 2011) for the ocean environment model neural network 2013. An action selector 2015 may determine adjustments to make to the transmit signal. In reinforcement learning, the procedure that undergoes training of the neural network 2013 is an agent 2010.

Referring to FIGS. 17A, 17B, in some embodiments, an initial ocean environment model O may be generated. The initial ocean environment model may be a generic ocean environment model for a generic ocean environment. In such case, (YES in S1701 and YES in S1703), in S1705, the initial ocean environment model O is provided. In S1701, if a generic ocean environment model is not used (NO in S1701), an ocean environment model O may be developed. In S1717, model identification (ID) transmit waveform types are defined depending on the identification approach used. Model ID is the process through which the Learning SONAR System establishes the surrounding operating conditions, covering the entire propagation path from the face of the transducer to the face of the TAM. Model ID can be done through various system ID approaches, such as Observer Kalman Identification (OKID), supervised deep learning through the generation of labeled input-output data on a CNN, or even standard frequency response system ID methods. In S1719, model ID transmit waveform types are transmitted to the ocean environment to facilitate modeling efforts. In S1721, the initial data may be used to build an ocean environment model O. In S1723, any additional model ID transmit waveforms may be transmitted to facilitate ocean environment modeling efforts. Provided additional data, in S1725 the ocean environment model O may be refined until in S1715, a stable model is reached (YES in S1715). In S1713, a stable model of the ocean environment is provided.

In a case that a generic ocean environment model is used (YES in S1710) and a later iteration is being performed (NO in S1703), the initial ocean environment model is refined with prior iteration data until a stable ocean environment model is reached (YES in S1709). A stable model means a model in which learning error settles to within a predetermined threshold. In S1711, a refined ocean environment model O is provided.

FIG. 17B is a flowchart for operation of the IL Estimator 709 once an initial ocean environment model has been provided as in the flowchart of FIG. 17A. In S1731, the initial ocean environment model of FIG. 17A is obtained. In an initial iteration (i=0 in S1733), the combined iterative learning and feedback controller is initialized. Initialization may include setting all initial parameter values. In S1737, updated parameter values, including transmit power, maximum correlation value, transmit waveform, pulse rate, are generated. In S1741, pulses for i+, the next iteration, are transmitted by the transmitter array 109, and in S1747, pulse signals are received by receiver array 107. In S1745, the leading edges of the received pulses are located using the appropriate processing steps, and in S1743 an SRA map P is generated. In S1739, a reasonableness check is performed based on P, the located receive pulses, and the ocean environment model O most recently provided. If the reasonableness checks are passed (YES in S1739), updated parameter values may again be generated for i+ in S1337. In S1749, the generated P may be used to obtain correlation surfaces. In order to generate a correlation surface, an inner product must be applied to all available spatially sampled signals $y_i^{ss}$, obtained using Equation (7), to sample the correlation surface. These samples are then used to estimate the full correlation surface via interpolation, as necessary depending on the spatial resolution achieved. Different P arrays may be used (S1753) to obtain correlation surfaces (S1749) until correlation surfaces checks are passed (YES in S1751). The P matrix, output by Adaptive SS 707, can change from iteration to iteration, based on TAM receivers. If for example, receivers are defective or behaving erratically, they will be removed or conditioned. Conditioning can be done through the use of amplification parameters for example. This is done by defining P using numerical values ranging from 0 to those that are necessary to make the unhealthy receiver, in need of conditioning, output consistent with that of a healthy receiver in the current operating ocean environment. The decision to remove receivers or modify/condition their outputs is determined by spatial sampling using the P matrix.

In S1755, 3D velocity and altitude estimates are generated. In generating 3D velocity, the peak of the correlation surface needs to be found and then the approximate displacement vector determined. From the displacement vector, 3D velocity can be found by assuming the platform was traveling at constant velocity and dividing the displacement vector by two times the correlation time. To determine altitude, the time it takes for roundtrip travel of the transmit signal is multiplied by the speed of sound in water. In S1759, when reasonableness checks are passed (YES in S1759), 3D velocity and altitude estimates are output to the reference filtering. In S1757, updated parameter values are again generated. Also, in the case that reasonableness checks in S1739 or S1759 are not passed (NO in S1739 or S1759), steps in FIG. 17A may be repeated to generate a stable ocean environment model O.

Reference estimation filtering may be used to maximize the accuracy and precision of the Learning SONAR System estimates. This filtering takes individual 3D velocity and altitude estimates generated each iteration and filters it to improve the accuracy and precision of the final 3D velocity and altitude reference output provided by the controller 101 to the host platform 120.

Figure 21:
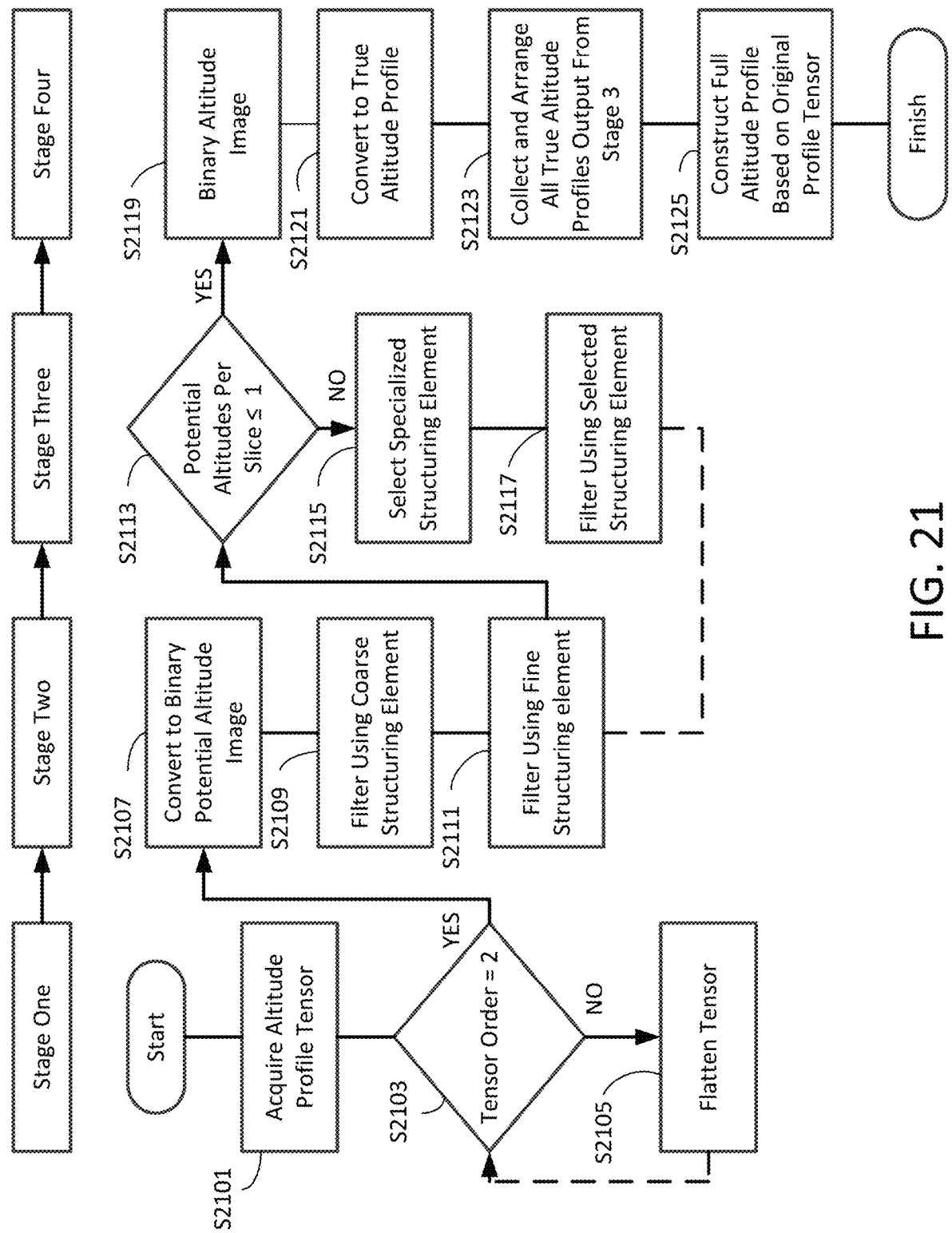
FIG. 21 is a flowchart for operation of the filter in accordance with an exemplary aspect of the disclosure.

FIG. 21 is a flowchart for a method of constructing a full altitude profile in accordance with an exemplary aspect of the disclosure. FIG. 21 depicts the Morphological Filtering Algorithm (MFA), as described in U.S. Pat. No. 10,026,182 ("the '182 patent") herein incorporated by reference in its entirety. MFA can be used directly on the altitude estimates output by the IL Estimator.

Regarding FIG. 21, in S2101, an altitude profile tensor generated using low-power sonar is accessed that identifies an altitude at each of a plurality of locations of the body of water. In one embodiment, if the altitude profile tensor comprises more than two orders (NO in S2103), in S2105, the altitude profile tensor is converted (sometimes referred to as flattened, or reduced) to a second-order depth profile tensor, wherein one dimension identifies a plurality of successive locations in the body of water in a particular direction, and a second dimension comprises one or more potential altitudes for each of the successive locations. The particular resolution of the second-order altitude profile tensor is stored and maintained. By way of non-limiting example, the locations identified in the first dimension of the second-order altitude profile tensor may be a linear succession of areas of the body of water that are 1 meter by 1 meter; 1 foot by 1 foot; or 2 meters by 2 meters. The second dimension altitudes may be in units of feet, meters, or any other desired distance. The second-order altitude profile tensor corresponds to a sweep, at the corresponding resolution, across the bottom of the body of water in a particular direction. Thus, the flattening process may result in the generation of hundreds, thousands, or millions of such second-order altitude profile tensors, each of which may be processed as discussed herein in order to generate a comprehensive binary altitude image of the desired area of the body of water. Thus, while the process herein will be described with respect to one second-order altitude profile tensor, it will be appreciated that the same process may be performed for each second-order altitude profile tensor. In S2107, the second-order altitude profile tensor is converted to a binary potential altitude image that depicts multiple potential altitudes for at least some locations. Specifically, the binary potential altitude image depicts a series of successive locations in the body of water based on the first dimension and depicts one or more altitudes for such series of successive locations based on the second dimension.

In one embodiment, the multiple potential altitudes are reduced, by at least one morphological filter process, to a single altitude for at least some locations to generate a binary altitude image (blocks S2113, S2119). In one embodiment, the binary potential depth image is first processed by a coarse morphological filter process using a coarse structuring element that eliminates at least some of the multiple potential altitudes at the same locations (block S2109). The coarse structuring element may comprise any suitable structuring element utilized by a coarse morphological filter process, such as a 3-row-by-3-column pixel structuring element centered around the potential altitude being evaluated, which will eliminate the potential altitude if, and only if, there are no potential altitudes in either or both the pixel columns to the left and right of the potential altitude in question. Another non-limiting example of a coarse morphological filter process is a 5-row-by-5-column pixel structuring element centered around the potential altitude being evaluated, which will eliminate the potential altitude if, and only if, there are no potential altitudes in at least 2 of the 4 pixel columns to the left and right of the potential altitude in question, or the like. Other coarse structuring elements operate solely based on locations identified in the same binary potential altitude image that is being processed.

The morphological filter process also includes reducing, by a fine morphological filter process using a fine structuring element, at least some remaining multiple potential altitudes for at least some locations (block S2111). The fine structuring element may comprise any suitable structuring element utilized by a fine morphological filter process, such as a 3-row-by-5-column pixel structuring element centered around the potential altitude being evaluated, which will eliminate the potential altitude if, and only if, there are no potential altitudes in at least 2 of the 4 pixel columns to the left and right of the potential altitude in question. Another non-limiting example of a fine morphological filter process is a 5-row-by-9-column pixel structuring element centered around the potential altitude being evaluated, which will eliminate the potential altitude if, and only if, there are no potential altitudes in at least 2 of the 8 pixel columns to the left and right of the potential altitude in question, or the like. Other fine structuring elements operate solely based on locations identified in the same binary potential altitude image that is being processed.

After the fine morphological filter process is completed, it is determined whether any slice of the binary potential altitude image comprises more than one altitude (block S2113). A "slice" refers to a particular location and the set of altitudes identified at that particular location. The binary potential altitude image comprises the same number of slices as the number of locations identified in the second-order tensor from which the binary potential altitude image was generated. If any slice contains more than one altitude, then a specialized structuring element is selected (block S2115). The specialized structuring element comprises one or more criteria for reducing the multiple altitudes to a single depth. The particular criteria may vary per application. By way of non-limiting example, the criteria may be the shallowest altitude of the plurality of altitudes, the deepest altitude of the plurality of altitudes, the collection of altitudes among the plurality of altitudes that results in the largest average slope for the final altitude profile, the collection of altitudes among the plurality of altitudes that results in the smallest average slope for the final altitude profile, a altitude that results in a smallest change in slope from altitudes identified in adjacent locations, or the like.

The binary potential altitude image is then filtered utilizing the selected specialized structuring element (FIG. 2, block S2117). The binary potential altitude image is then processed, again, by the fine morphological filter process using the fine structuring element (FIG. 2, block S2111). This process may be repeated until each slice of the binary potential altitude image comprises one or fewer altitudes (FIG. 2, blocks S2111-S2117).

This process results in the generation of a binary altitude image, wherein each slice location comprises one or fewer altitudes (FIG. 2, block S2119). The binary altitude image is then converted to a true altitude profile (FIG. 2, block S2121). The true altitude profile is a second-order tensor that identifies one or fewer altitudes for each location. As discussed above, the process was described for a single second-order altitude profile tensor but is repeated for a number of second-order altitude profile tensors sufficient to describe altitudes at the particular area of the body of water. Each iteration generates a true altitude profile at the respective granularity/resolution at which the corresponding binary potential altitude image was generated at block S2107. When complete, all the true altitude profiles are accumulated and arranged together (FIG. 2, block S2123). The true altitude profiles are then used to construct a full altitude profile tensor based on the original profile tensor (FIG. 2, block S2125). For example, if the original profile tensor is a fourth-order altitude profile tensor containing information about a rectangular area that is X feet by Y feet with altitudes of Z feet at time T, and if the original profile tensor is "flattened" into 10 separate second-order altitude profile tensors in the Y direction, then the 10 individual second-order altitude profile tensors are reconstructed based on the original profile tensor in the same Y direction to create the full fourth-order altitude profile tensor.

Figure 22A:
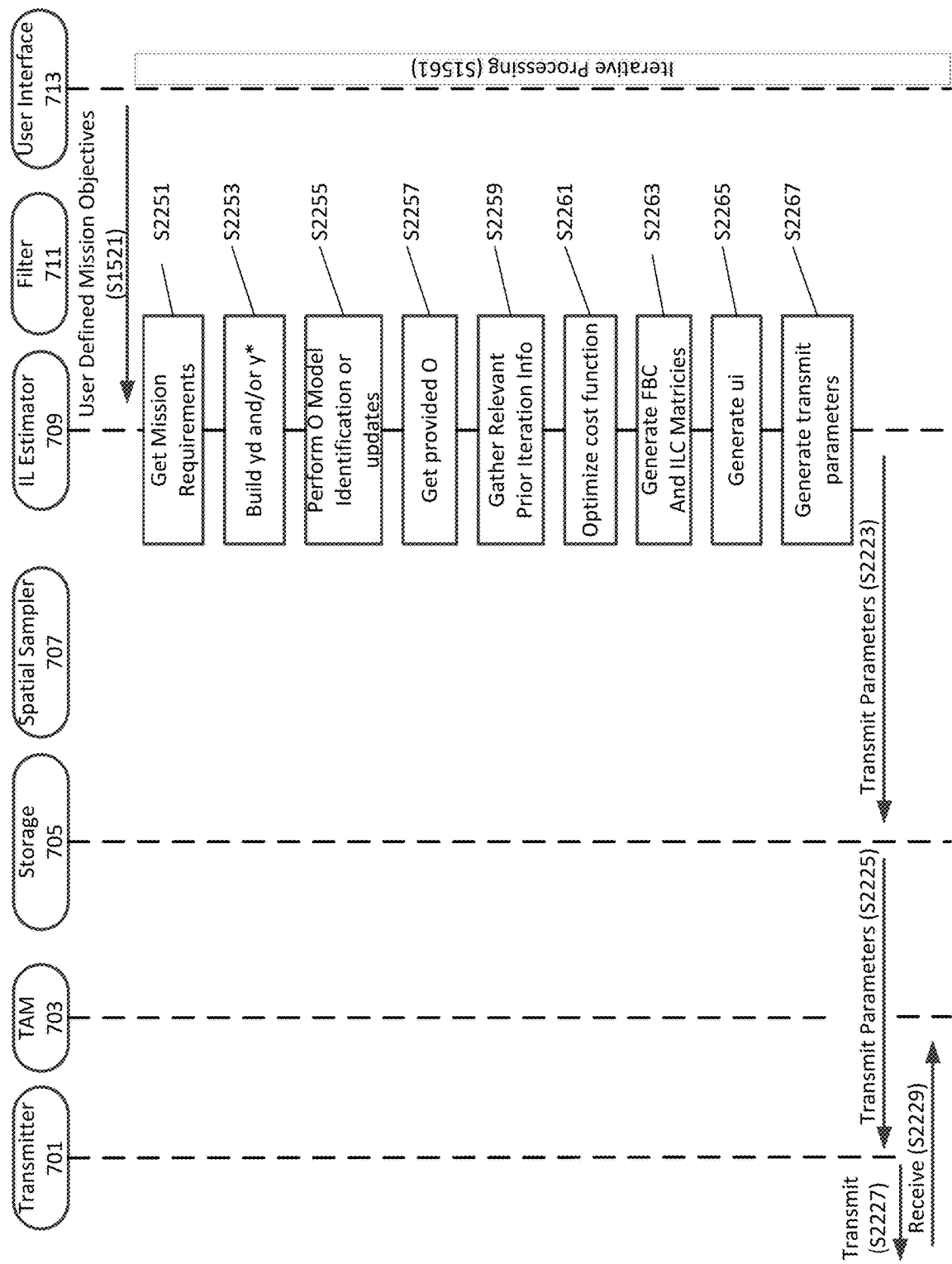
FIGS. 22A, 22B are a sequence diagram for operation of the Learning SONAR System in accordance with an exemplary aspect of the disclosure.
Figure 22B:
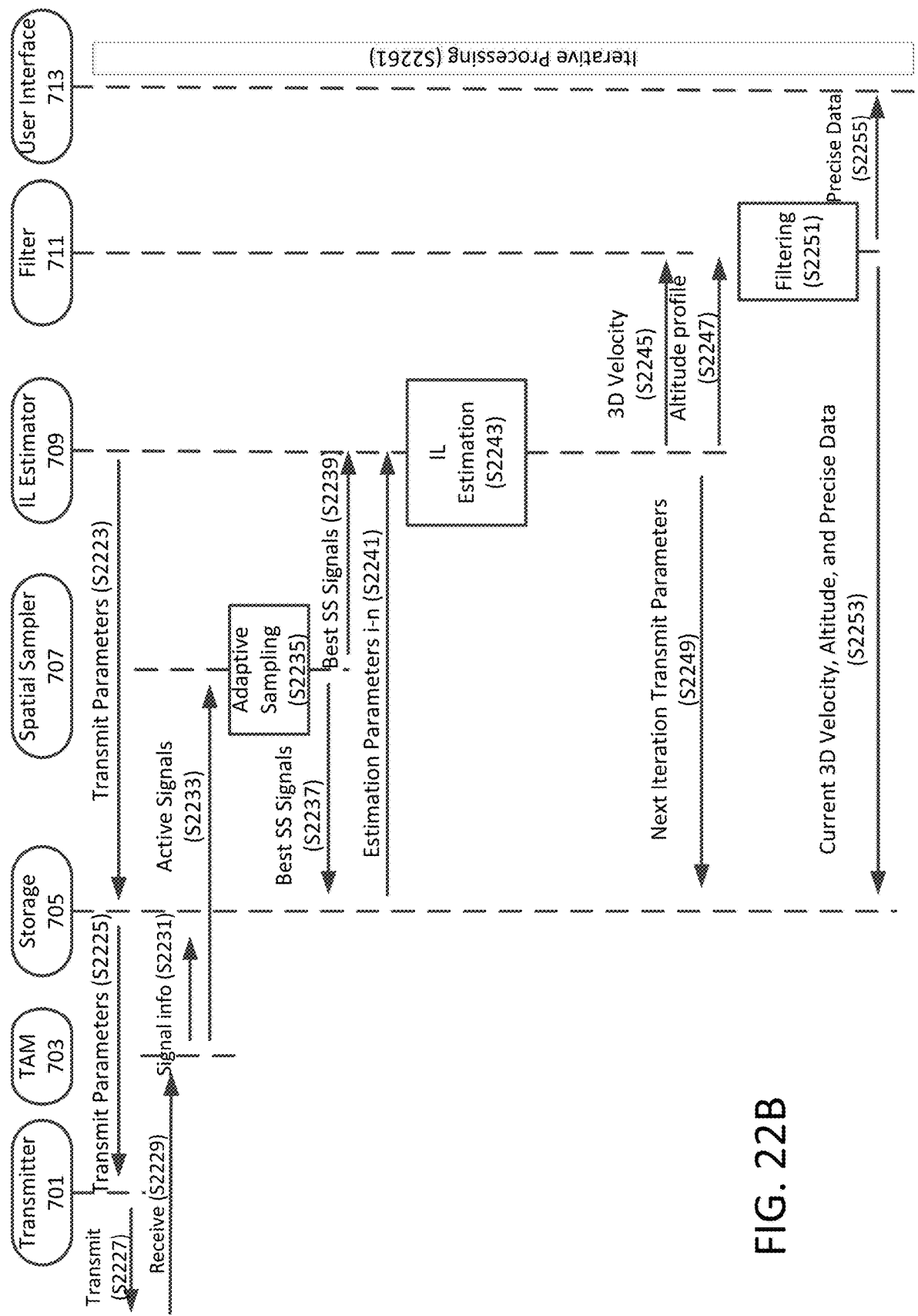

A description of the overall operation of the Learning SONAR System is provided. FIGS. 22A, 22B are a sequence diagram of operation of the Learning SONAR System in accordance with an exemplary aspect of the disclosure. In S2221, a user may enter mission requirements, using an interface such as the interface 713 shown in FIG. 6. The IL Estimator 709 generates transmit parameters for the transmit array 109. In particular, the IL Estimator 709 performs steps in FIG. 22A, 22B. In S2251, the IL Estimator 709 obtains the mission requirements. In S2253, the IL Estimator 709 builds desired output yd and/or training matrix Y. In S2255, the IL Estimator 709 uses a system identification approach to perform ocean environment model identification (ID) or updates (see FIG. 22A), and in S2257 obtains the ocean environment model O. In S2259, the IL Estimator 709 obtains prior iteration information, and in S2261 optimizes the cost function using the ocean environment model O and prior iteration information. In S2263, matrices, such as F, G, H, L, are generated for the combined controller. Provided the controller matrices, in S2265, the combined controller is used to generate $u_i$ for the current iteration. In S2267, transmit parameters are generated for the current iteration. In S2253, the transmit parameters are stored in storage 705, which in S2225 are provided to transmitter array 109 (transmitter 501). In S327, the transmitter 701 transmits pulsed signals. Further, in S2229, pulsed signals are received by the TAM 703. In S2231, signal information received by the TAM 703 is stored in storage 705. In S2233, active signals are sent by the TAM 703 to the Adaptive SS 707. In S2235, the Adaptive SS 707 performs adaptive sampling (see FIG. 15). The Adaptive SS 707 provides spatially sampled signals to storage 705 (S2237) and to IL Estimator 709 (S2239). In S2241, the IL Estimator 709 obtains previous estimation parameters i-n and, in S2243 performs IL estimation (see FIG. 17A, 17B). In S2245 and S2247, the IL Estimator 709 provides 3D velocity and altitude to the reference estimation filters 711, and in S2249 stores iteration transmit parameters in storage 705. In S2251, filter 711 performs filtering operation on the estimated 3D velocity and altitude to obtain more precise data. In S2253, the current 3D velocity, current altitude, and precise data are stored in storage 705. In S2255, the precise data may be provided to the user interface. In S2261, the next iteration is performed.

The above described Learning SONAR System implementation can be used as an Intelligent 3D Platform Velocity Reference Sensor by installing the system on a host marine platform and operating the platform within design constraints associated predominantly with the size of transmit and receive hardware. The technology is specifically designed to be an intelligent and self-sustaining sensor. It requires the incorporation and heavy use of a transmitter to get the signal specified by the IL Estimator into the ocean. Heavy use of a receiver is also necessary to acquire the echo returns through a TAM for full IL Estimation and Reference Estimation Filtering. Once several iterations are completed and the Reference Estimation Filter is settled, the system will provide highly accurate and precise 3D velocity reference to the host platform. For optimal results, the system will require some ability to control the platform in terms of holding it at a constant velocity, constant heading, minimizing attitude, speeding up, slowing down, etc. The 3D velocity reference is intelligently generated by the system with no input from the user or operator, beyond defining mission requirements, by learning through interactions with its local ocean environment from iteration to iteration. The learning is reflected in refinements and updates to the control signals and ocean environment model. Additional hardware or sensors outside of the system configuration can be used if available, but the system can generally be available with transmit and receive hardware included in the configuration. Thus for the Intelligent 3D Platform Velocity Reference Sensor, additional hardware or sensors is optional.

Although the above disclosure describes an implementation, the aspects of iterative learning and adaptive spatial sampling may be used in other systems. Other uses may include Intelligent Altitude Reference Sensor, Commercial Dead-Reckoning Navigation, Autonomous Underwater Commercial Search Ops, Autonomous Underwater Commercial Survey Ops, Intelligent Military GPS-Denied Reference Sensor, Autonomous Underwater Military Surveillance, and Autonomous Underwater Military Reconnaissance.

Similar to the Intelligent 3D Platform Velocity Reference Sensor, an Intelligent Altitude Reference Sensor can also be done by installing the above-described system on a host marine platform. The platform operations will again be limited by the transmit and receive hardware. However, unlike velocity reference operations, an Intelligent Altitude Reference Sensor typically does not benefit from increased spatial sampling. This means that transmit and receive hardware constraints related to transmit power and array gain will be less limiting. Once again, for optimal results, some ability will be required to control the platform in terms of holding it at a constant velocity, constant heading, minimizing attitude, speeding up, slowing down, etc. For the intelligent altitude reference sensor, the overall accuracy and precision of the altitude reference will increase with the number of iterations as more and more individual estimates are collected. This will be especially true if Reference Estimation Filtering is used. As with the 3D velocity reference, the altitude reference is intelligently generated by learning through interactions with its local ocean environment from iteration to iteration. The learning is again reflected in refinements and updates to the control signals and ocean environment model. Additional hardware or sensors can be used if available. However, as with the Intelligent 3D Platform Velocity Reference Sensor, additional hardware or sensors are also optional.

Support of Commercial Dead-Reckoning Navigation is a natural application of the above-disclosed system, however it would require additional hardware and specific complimentary system capabilities. The additional hardware and system capabilities are beyond the Intelligent 3D Platform Velocity Reference Sensor and would either require a request for customization or must be provided by the host platform. The most critical hardware that is required is an Inertial Measurement Unit (IMU) to keep track of orientation and position when reference data is not available. Both 3D velocity and precision altitude or distance reference are necessary for dead-reckoning navigation. Velocity can be integrated to provide a rudimentary position reference which, when combined with IMU outputs through a data fusion scheme, can be used for navigation. The altitude reference can be collected over a large stretch of ocean bottom to build a bathymetric map which, when combined with commercially available maps of the ocean bottom, can provide position fixes. The position fixes can be used to reset and align the IMU periodically to bound IMU errors. Complimentary system capabilities like data fusion, bathymetric map building, and manipulation of commercial ocean maps are necessary to enable prolonged use for Commercial Dead-Reckoning Navigation.

Support for Autonomous Underwater Commercial Search Ops can help enhance the ability of the autonomous platform to conduct search operations in areas all over the world, with or without GPS availability. Often times during extensive emergency search operations, the main limiting factor is physical restrictions experienced by the human operator. If the human operator were to be removed and autonomous platforms were used instead, search operations can potentially be executed continuously over a larger range with lower cost. Efficiency and range of the platforms could be noticeably improved by providing very low-power 3D velocity and precision altitude reference. These references allow for more accurate platform control, extended operations without needing to surface, and better knowledge of the search areas which, overall, allow for a more coordinated and efficient search effort. This can make a big difference in emergencies.

Support for Autonomous Underwater Commercial Survey Ops can help the survey platform by facilitating more accurate platform control, extending operational duration, extending operational range, and providing more precise location information which ultimately leads to better overall surveys. Unlike Search Ops, modern Underwater Survey Ops already make extensive use of autonomous platforms, so in many ways the Learning SONAR System is uniquely designed for this exact use case. As a result, one of the main focuses will be to establish the Learning SONAR System within the Commercial Survey Ops market which is largely driven today by the needs of big oil and gas companies.

In today's military operating environment, being able to successfully execute a mission without reliance on GPS is quickly becoming a requirement verse a luxury. To that end, both an Intelligent 3D Platform Velocity Reference Sensor and Intelligent Altitude Reference Sensor are game changers. Since the Learning SONAR System can provide both references for commercial applications, it should be clear that it can similarly be used for military applications. This is because the Learning SONAR System uses acoustic signals transmitted and received in the water to generate its references, so it is designed to operate without GPS and, in fact, provides platforms currently reliant on GPS a very feasible alternative.

In addition to being an ideal GPS-denied reference sensor, the Learning SONAR System is also well suited for use in Autonomous Underwater Military Surveillance applications. This is due to the fact that the Learning SONAR System is specially designed for covert operations that allow it to be used with very low-power and even in situations where return signals, sensed by the TAM receive hardware, are on the same level as noise in the local ocean environment. With the installation and proper use of the Learning SONAR System, autonomous underwater platforms would greatly benefit from the more accurate platform control, extended duration and range, and precise location information offered by the intelligent sensor technology.

Another comparable use case is Autonomous Underwater Military Reconnaissance. An autonomous platform can operate on its own or, more ideally, several autonomous platforms could be further missionized using the Learning SONAR System to perform reconnaissance and intelligence gathering in a large underwater area. Precise absolute location information for each platform, as well as location information of each platform relative to the other is critical. That capability, in addition to the more accurate platform control and extended operations, is something the Learning SONAR System can provide.

Numerous modifications and variations of the present invention are possible in light of the above teachings. For example, the present invention may be applied to vehicles, aircraft, spacecraft, and other environments. It is therefore to be understood that within the scope of the appended claims, the invention may be practiced otherwise than as specifically described herein.

What is claimed is:

1. A learning SONAR system, comprising:
    an input configured to receive mission parameters including one or more of mission accuracy, mission covertness, learning rate, and training matrix dependency;
    a transmitter configured to transmit pulsed signals;
    a tunable acoustic receiver having a plurality of individually controllable receiver elements configured to receive return pulsed signals based on the transmitted pulsed signals; and
    a learning controller having circuitry configured as an adaptive spatial sampler and a combined iterative learning and a feedback controller,
    wherein the adaptive spatial sampler determines a number of the plurality of individually controllable receiver elements, and the combined iterative learning and feedback controller generates, using the determined number of individually controllable receiver elements, estimates of altitude and 3D velocity based on a combination of transmit power, signal-to-noise ratio, and altitude range.

2. The learning SONAR system of claim 1, wherein the adaptive spatial sampler determines a minimum number of the individually controllable receiver elements for generating the estimates based on the mission accuracy and the mission covertness.

3. The learning SONAR system of claim 1, wherein the adaptive spatial sampler determines a selection of the individually controllable receiver elements based on a desired array gain and a desired signal to noise ratio provided by the combined iterative learning and feedback controller.

4. The learning SONAR system of claim 1,
    wherein the combined iterative learning and feedback controller iteratively performs a cost function based on the mission parameters, and
    wherein the iterative performance of the cost function emphasizes either iterative learning or feedback in the combined iterative learning and feedback controller.

5. The learning SONAR system of claim 1, wherein the combined iterative learning and feedback controller includes an adaptive ocean environment model that adjusts for characteristic values of ocean salinity, ocean temperature, a transmit pulsed signal, and a received pulsed signal.

6. The learning SONAR system of claim 5, wherein the adaptive ocean environment model is trained using supervised machine learning.

7. The learning SONAR system of claim 5,
    wherein the adaptive ocean environment model continuously adapts using reinforcement learning,
    wherein an input for the adaptive ocean environment model includes the transmit pulsed signal and an output includes an expected transmit pulsed signal, and
    wherein the reinforcement learning produces recommended adjustments to the input transmit pulsed signal and provides the adaptive ocean environment model with an assessment of the recommended adjustments.

8. The learning SONAR system of claim 1, wherein the combined iterative learning and feedback controller performs a single iteration for each transmission of transmit pulsed signals by the transmitter.

9. The learning SONAR system of claim 8, wherein at each iteration, the combined iterative learning and feedback controller provides transmit parameters for the transmitter including transmit signal waveform, pulse rate, and transmission power.

10. The learning SONAR system of claim 1, further comprising a reference estimate filter circuit configured to generate precise 3D velocity and precise altitude based on the 3D velocity and altitude provided by the combined iterative learning and feedback controller.

11. A learning SONAR method, comprising:
    receiving mission parameters including one or more of mission accuracy, mission covertness, learning rate, and training matrix dependency;
    transmitting, by a transmitter, transmit pulsed signals;
    receiving return pulsed signals in a tunable acoustic receiver having a plurality of individually controllable receiver elements;
    determining, by an adaptive spatial sampling circuitry, a number of the plurality of controllable receiver elements; and
    generating, by a combined iterative learning and feedback controller using the determined number of the receiver elements, estimates of altitude and 3D velocity based on a combination of transmit power, signal-to-noise ratio, and altitude range.

12. The learning SONAR method of claim 11, further comprising determining, by the adaptive spatial sampler circuitry, a minimum number of the controllable receiver elements for generating the estimates based on the mission accuracy and the mission covertness.

13. The learning SONAR method of claim 11, further comprising determining, by the adaptive spatial sampler circuitry, a selection of the controllable receiver elements based on a desired array gain and a desired signal to noise ratio provided by the combined iterative learning and feedback controller.

14. The learning SONAR method of claim 11, further comprising iteratively performing, by the combined iterative learning and feedback controller, a cost function based on the mission parameters, wherein the iterative performing of the cost function emphasizes either iterative learning or feedback in the combined iterative learning and feedback controller.

15. The learning SONAR method of claim 11, further comprising adaptively adjusting, by the combined iterative learning and feedback controller, an adaptive ocean environment model for characteristic values of ocean salinity, ocean temperature, a transmit pulsed signal, and a received pulsed signal.

16. The learning SONAR method of claim 15, further comprising training the adaptive ocean environment model using supervised machine learning.

17. The learning SONAR method of claim 15, further comprising continuously adopting the adaptive ocean environment model using reinforcement learning, wherein an input for the ocean environment model includes the transmit pulsed signal and an output includes an expected transmit pulsed signal, and wherein the reinforcement learning produces recommended adjustments to the input transmit pulsed signal and provides the adaptive ocean environment model with an assessment of the recommended adjustments.

18. The learning SONAR method of claim 11, wherein the generating includes performing a single iteration, by the combined iterative learning and feedback controller, for each transmission of transmit pulsed signals by the transmitter.

19. The learning SONAR method of claim 18, wherein at each iteration, the combined iterative learning and feedback controller provides transmit parameters for the transmitter including transmit signal waveform, pulse rate, and transmission power.

20. The learning SONAR method of claim 11, further comprising generating precise 3D velocity and precise altitude, by a reference estimate filter circuit, based on the estimated 3D velocity and altitude provided by the combined iterative learning and feedback controller.

\* \* \* \* \*